United States Patent
Poirot-Crouvezier

(10) Patent No.: US 10,243,220 B2
(45) Date of Patent: Mar. 26, 2019

(54) BIPOLAR PLATES FOR LIMITING THE BYPASSING OF THE FLOW CHANNELS BY THE REACTANTS

(71) Applicant: Commissariat A L'Energie Atomique et aux Energies Alternatives, Paris (FR)

(72) Inventor: Jean-Philippe Poirot-Crouvezier, Saint Georges de Commiers (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 101 days.

(21) Appl. No.: 15/351,829

(22) Filed: Nov. 15, 2016

(65) Prior Publication Data

US 2017/0141412 A1    May 18, 2017

(30) Foreign Application Priority Data

Nov. 17, 2015 (FR) ..................... 15 61040

(51) Int. Cl.
*H01M 8/02* (2016.01)
*H01M 8/0258* (2016.01)
(Continued)

(52) U.S. Cl.
CPC ......... *H01M 8/0258* (2013.01); *H01M 8/026* (2013.01); *H01M 8/0206* (2013.01);
(Continued)

(58) Field of Classification Search
CPC .... H01M 8/025; H01M 8/026; H01M 8/0247; H01M 8/0206; H01M 8/0254; H01M 2008/1095; H01M 2250/20; Y02T 90/32
See application file for complete search history.

(56) References Cited

U.S. PATENT DOCUMENTS 8,778,548 B2   7/2014  Garnit et al.
2007/0207365 A1   9/2007  Ohnuma
(Continued)

FOREIGN PATENT DOCUMENTS

WO   WO 2004/102712 A2   11/2004
WO   WO 2009/156295 A1   12/2009

OTHER PUBLICATIONS

Search Report dated Apr. 24, 2017 in European Patent Application No. 16196984.5 (with English translation of categories of cited documents).

(Continued)

*Primary Examiner* — Cynthia K Walls
(74) *Attorney, Agent, or Firm* — Oblon, McClelland, Maier & Neustadt, L.L.P.

(57) ABSTRACT

An electrochemical cell includes a membrane electrode assembly and a bipolar plate. The membrane electrode assembly includes a proton exchange membrane and first and second electrodes. The bipolar plate includes conductive sheets, coolant flow channels are made between the conductive sheets. An outer face of a conductive sheet includes reactant flow channels and a first rib extending on the side of the reactant flow channels. A gasket extends on the first rib. The bipolar plate includes an intermediate zone extending between the first rib and the first electrode, a first band in which the sheets have complementary shapes nested one in the other over the entire length of a coolant flow channel, and a second band in which a sheet includes reliefs in contact with the membrane electrode assembly.

12 Claims, 15 Drawing Sheets

(51) Int. Cl.
*H01M 8/0247* (2016.01)
*H01M 8/0206* (2016.01)
*H01M 8/0254* (2016.01)
*H01M 8/026* (2016.01)
*H01M 8/0267* (2016.01)
*H01M 8/1018* (2016.01)

(52) U.S. Cl.
CPC ....... *H01M 8/0247* (2013.01); *H01M 8/0254* (2013.01); *H01M 8/0267* (2013.01); *H01M 2008/1095* (2013.01); *H01M 2250/20* (2013.01); *Y02T 90/32* (2013.01)

(56) References Cited

U.S. PATENT DOCUMENTS

| | | | |
|---|---|---|---|
| 2007/0298308 A1 | 12/2007 | Yamamoto et al. | |
| 2008/0131755 A1* | 6/2008 | Lee | H01M 8/0247 429/434 |
| 2009/0169964 A1 | 7/2009 | Ikeda | |
| 2010/0028742 A1* | 2/2010 | Jeon | H01M 8/0258 429/465 |

OTHER PUBLICATIONS

French Preliminary Search Report dated Jul. 8, 2016 in French Application 15 61040, filed on Nov. 17, 2015 ( with English Translation of Categories of Cited Documents and Written Opinion).

\* cited by examiner

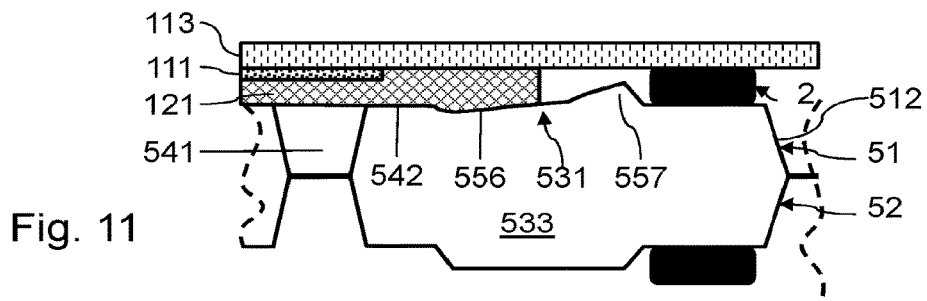
Fig. 11
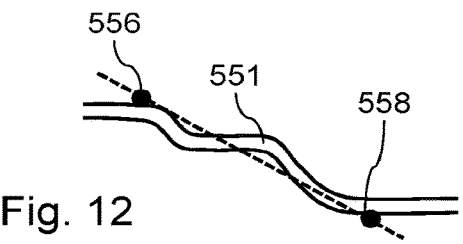
Fig. 12
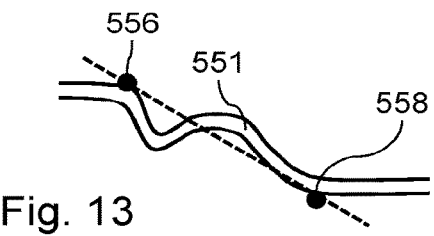
Fig. 13
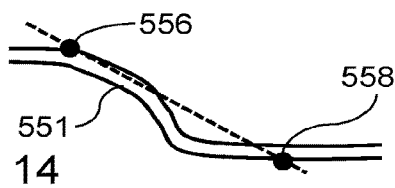
Fig. 14
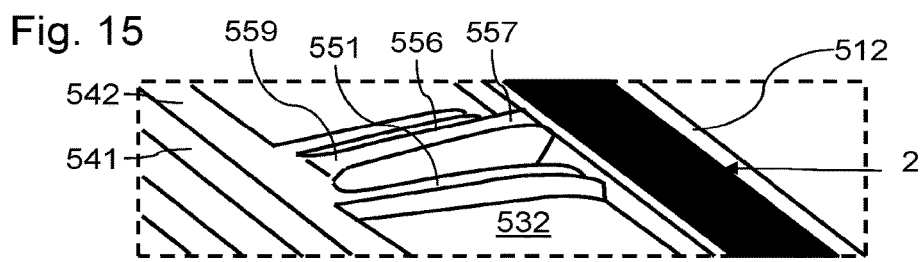

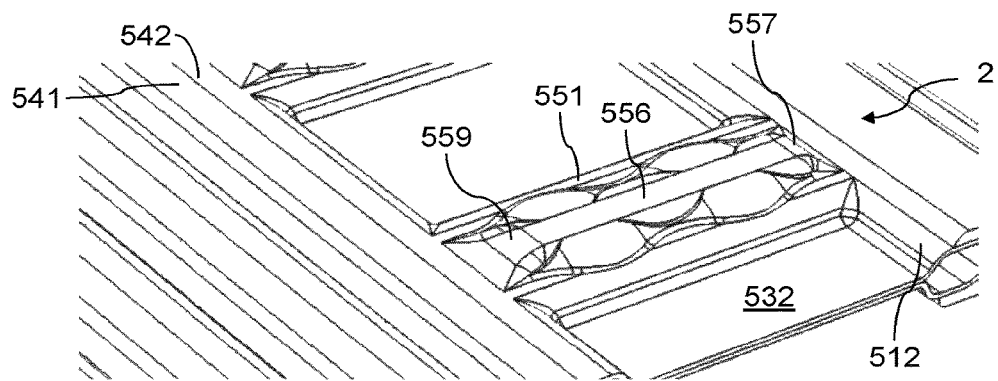
Fig. 16
Fig. 17
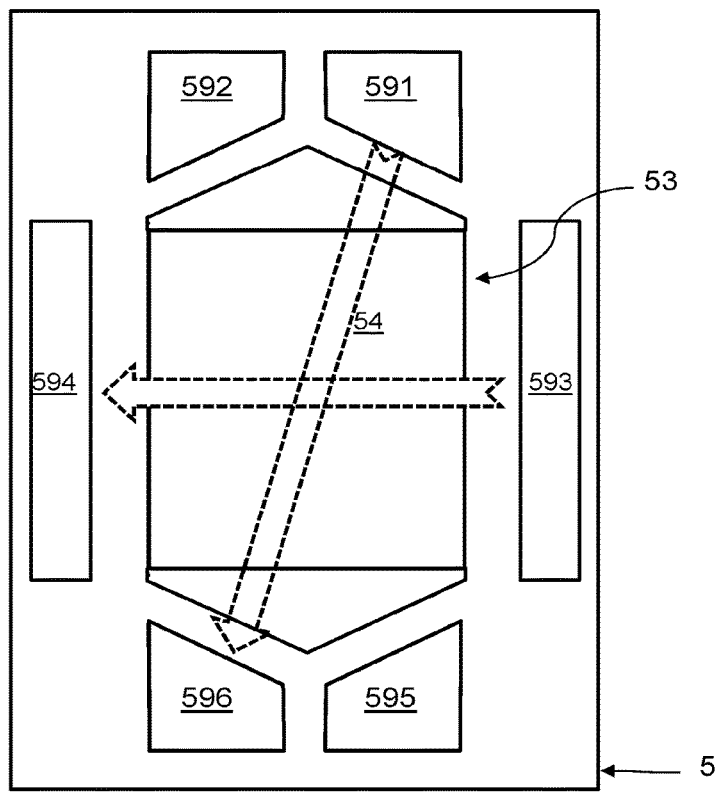

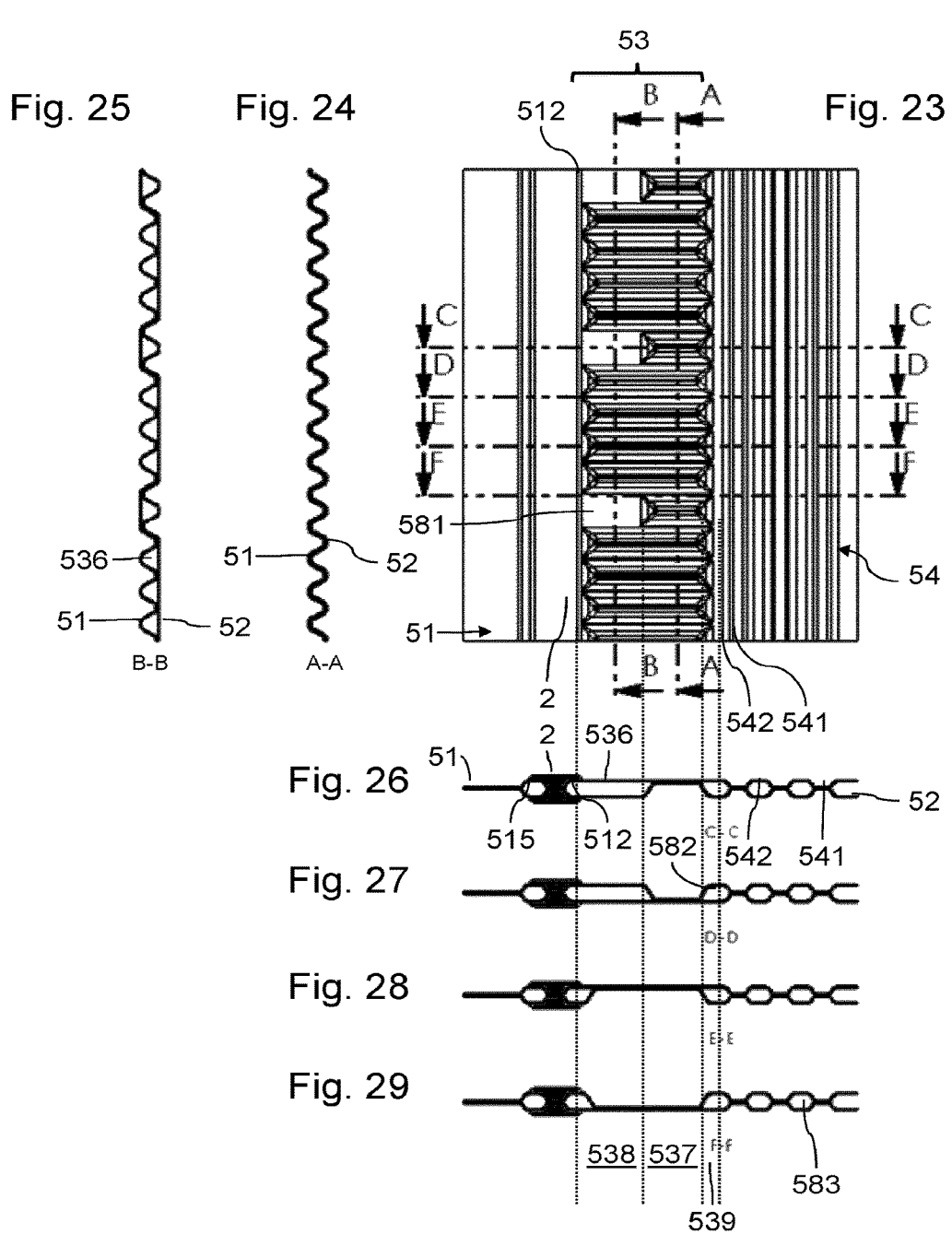

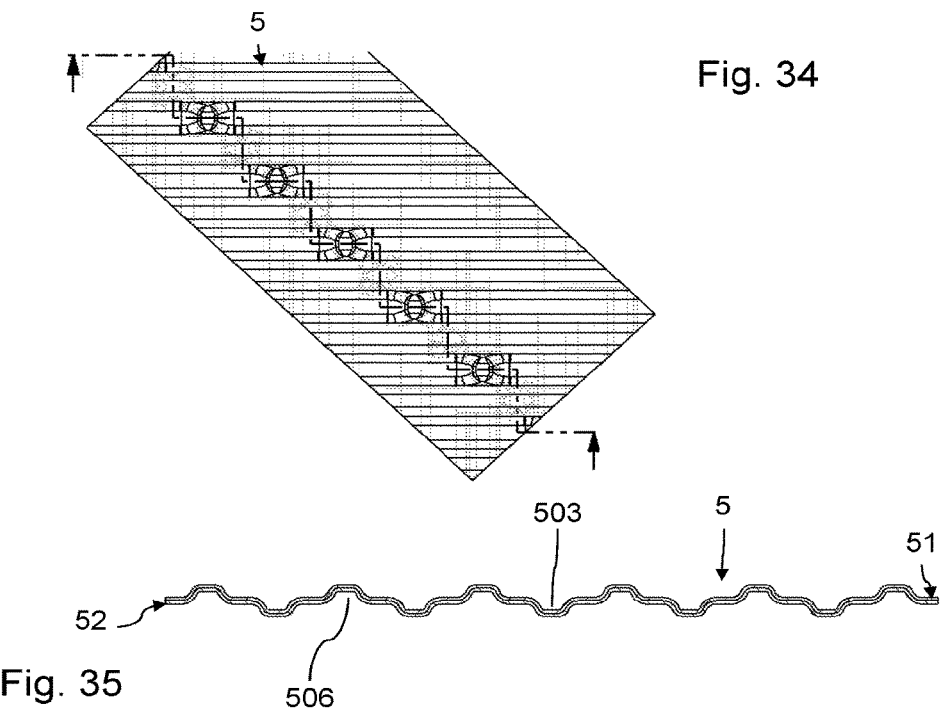
Fig. 34
Fig. 35
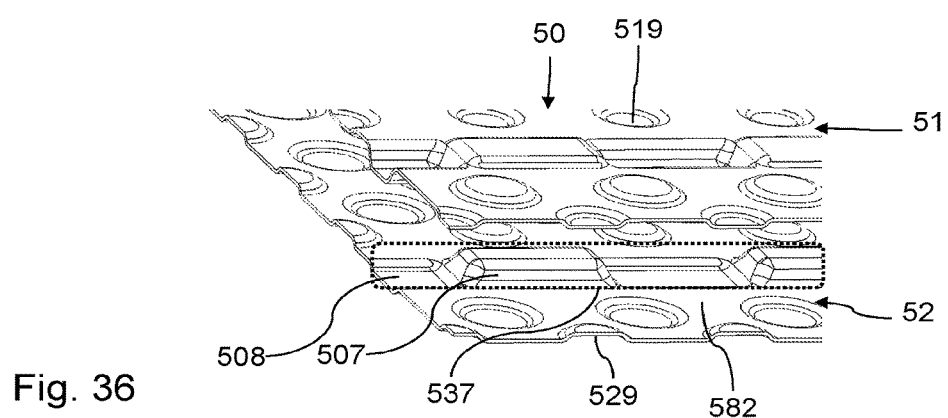
Fig. 36

Fig. 39
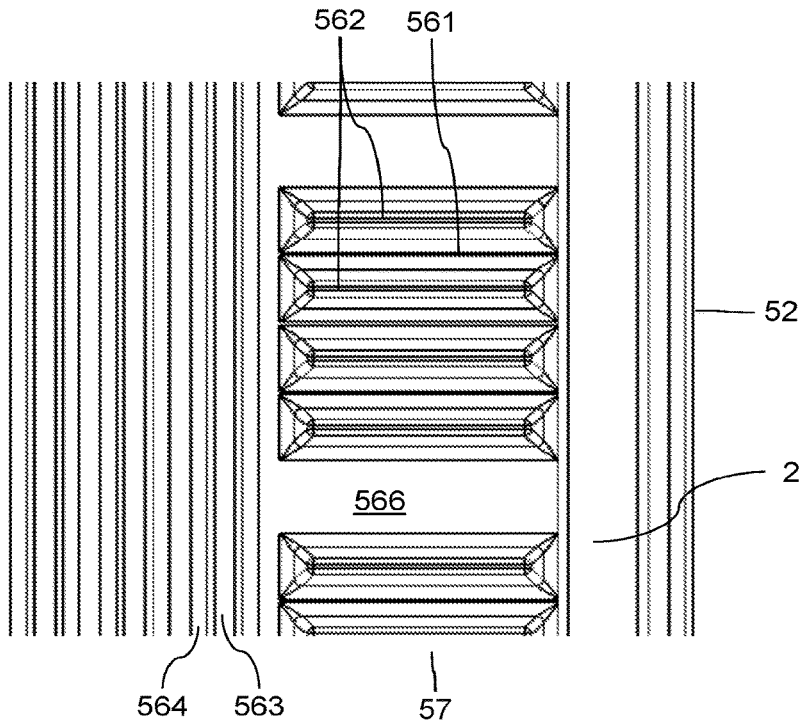
Fig. 40
Fig. 41
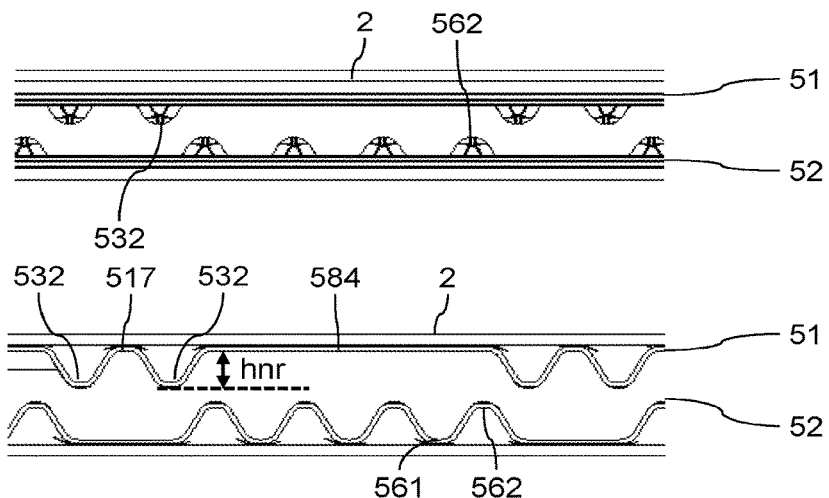

BIPOLAR PLATES FOR LIMITING THE BYPASSING OF THE FLOW CHANNELS BY THE REACTANTS

The invention relates to electrochemical reactors with membrane electrode assemblies and bipolar plates, such as low-temperature fuel cell stacks or electrolysers. The invention relates in particular to the limitation of fluid short-circuits in such electrochemical reactors.

Fuel cell stacks are for example envisioned as systems for supplying electricity to mass-produced automotive vehicles in the future, and for a large number of applications. A fuel cell stack is an electrochemical device that converts chemical energy directly into electrical energy. A fuel such as molecular hydrogen or methanol is used as fuel of the fuel cell stack.

In the case of molecular hydrogen, it is oxidized and ionized on one electrode of the stack and an oxidant is reduced on another electrode of the stack. The chemical reaction produces water at the cathode, oxygen being reduced and reacting with the protons. The great advantage of the fuel cell stack is that it avoids discharges of atmospherically polluting compounds at the site of electricity generation.

Proton exchange membrane (PEM) fuel cell stacks operate at low temperature and have particularly advantageous compactness properties. Each cell comprises an electrolytic membrane that allows only protons to pass through and not electrons. The membrane comprises an anode on a first face and a cathode on a second face in order to form a membrane electrode assembly (MEA).

At the anode, the molecular hydrogen is ionized in order to produce protons that pass through the membrane. The electrons produced by this reaction migrate toward a flow plate, then pass through an electrical circuit that is external to the cell in order to form an electric current. At the cathode, oxygen is reduced and reacts with the protons to form water.

The fuel cell stack may comprise several plates, referred to as bipolar plates, for example made of metal, stacked on top of one another. The membrane is positioned between two bipolar plates. The bipolar plates may comprise flow channels and orifices in order to guide the reactants and the products to/from the membrane, in order to guide coolant, and in order to separate various compartments. The bipolar plates are also electrically conductive so as to form collectors of the electrons generated at the anode. According to a relatively common design, a bipolar plate is formed of two metal sheets assembled by welding and that generally make between them flow channels for a coolant.

The bipolar plates also have a mechanical role of transmitting the stack clamping forces, necessary for the quality of the electrical contact. Gas diffusion layers are inserted between the electrodes and the bipolar plates and are in contact with the bipolar plates. Electron conduction is carried out through the bipolar plates, ion conduction being obtained through the membrane.

The bipolar plates continuously supply the reactive surfaces of the electrodes with reactants, as they are consumed. The bipolar plates comprise networks of flow channels that ensure the distribution of the reactants into the reactive zones. The networks of flow channels are connected between inlet and outlet manifolds, generally passing right through the stack. Each manifold is surrounded by a gasket to prevent the mixing of the various fluids circulating in the fuel cell. Injection zones are defined in order to enable the reactants to cross these gaskets toward appropriate flow channels. A homogenizing zone usually connects an injection zone to flow channels. A peripheral gasket generally surrounds the flow channels, the injection zones and the homogenizing zones, on each face of a bipolar plate. This gasket ensures the sealing of the inside of the fuel cell stack with respect to the outside.

The passage of the reactants from an inlet manifold to an outlet manifold, through the flow channels of a reactive zone, induces a pressure drop in this flow. Thus, any passage between these manifolds that short-circuits the flow channels of the reactive zone induces a significant parasitic flow of reactant since this passage may have a pressure drop lower than that of the flow channels of the reactive zone. This parasitic flow does not participate in the electrochemical reaction.

In this regard, any space between the reactive zone and the peripheral gasket is a source of flow that short-circuits the reactive zone. Due to the manufacturing tolerances of certain industrial processes for producing components, for example for assembling or cutting MEAs, it is necessary to maintain significant peripheral spaces between the peripheral gasket and the reactive zone. In particular, a peripheral space having a width of between 2 and 7 mm is usually necessary in order to satisfy the tolerances for positioning and fabricating the membrane electrode assembly and the sheets of the bipolar plates.

The short-circuit flows are also influenced by the flow modes of the reactants and of the coolant, in particular by their respective flow directions. Either the reactants flow in the same direction as the coolant. Then, the peripheral spaces creating short-circuit flows for the coolant and for the reactants are positioned on the lateral edges of the bipolar plates. Or the reactants flow in a direction perpendicular to that of the coolant. Then, the coolant flow peripheral space is positioned directly below/above or plumb with the homogenizing zones, on either side of the ends of the reactant flow channels. One difficulty is that any alteration of a sheet in order to limit a short-circuit flow impacts the other face of the sheet, and therefore potentially the functionalities of this other face of the sheet.

The various gaskets are positioned either at the top of ribs, or in indentations of the sheets. Depending on the configuration of the gaskets, the cross section of a peripheral passage is larger or smaller.

In the case of gaskets positioned in indentations of the sheets, the flow area in the peripheral spaces for the reactants is relatively limited. On the contrary, the peripheral flow area is increased for a short-circuit flow of the coolant between the sheets.

In the case of gaskets positioned at the top of ribs, the cross section of a peripheral passage is then relatively large. In order to reduce the parasitic flow of reactant in a peripheral space, it is known to produce an alternation of ribs and indentations along this passage. However, this solution only reduces the parasitic flow of reactant in the peripheral spaces in a limited manner. Document FR 2 887 686 proposed to produce a gasket moulded onto a rib in order to fill a portion of the indentations of the peripheral passage. Such a moulded gasket makes the manufacturing process significantly more complex and difficult to automate, which may substantially increase the manufacturing cost. Furthermore, such a gasket may greatly alter the flow of the coolant.

These problems, well known for fuel cell stacks, are also faced for other types of electrochemical reactors with membrane electrode assemblies, such as electrolysers.

Document WO 2010/018656 deals with coolant flow problems and describes a bipolar plate, comprising first and second conductive sheets. These sheets comprise formed bosses distributed in zones of reversal of flow direction in a reactive zone.

Document US 2007/298308 describes a fuel cell stack structure. Negative and positive studs are formed in sheets of a bipolar plate, in a homogenizing zone. A flat intermediate zone is formed between flow channels and a gasket support.

The invention aims to solve one or more of these drawbacks. The invention thus relates to an electrochemical cell, comprising:

a membrane electrode assembly including a proton exchange membrane and first and second electrodes fastened to opposite faces of said membrane;

a bipolar plate, comprising first and second conductive sheets, and in which:

an inlet manifold and an outlet manifold of coolant, and an inlet manifold and an outlet manifold of a reactant are made through the first and second conductive sheets;

coolant flow channels are made between the conductive sheets and are in communication with the coolant inlet and outlet manifolds;

an outer face of the first conductive sheet comprising:

reactant flow channels in communication with the reactant inlet and outlet manifolds, covered by the first electrode of the membrane electrode assembly;

a first rib extending over the side of the reactant flow channels, a gasket extending at least partially over said first rib;

the bipolar plate comprising an intermediate zone extending between the first rib and said first electrode, and comprising:

a first band in which the first and second sheets have complementary shapes nested one in the other over the entire length of at least one coolant flow channel;

a second band positioned between the first band and the first rib, in which the first sheet comprises reliefs in contact with the membrane electrode assembly, and in which at least one coolant storage volume is made between the first and second sheets.

The invention makes it possible to reduce the short-circuit flow for the coolant and for the reactant, while retaining a store of coolant outside of the reactive zone. The flow is blocked between the coolant flow channels of the reactive zone and coolant storage zones outside of the reactive zone.

The invention also relates to the following variants. A person skilled in the art will understand that each of the features of the following variants may be combined independently with the features above, without, for all that, constituting an intermediate generalization.

According to one variant, a direction connecting the coolant inlet manifold to the coolant outlet manifold is substantially parallel to a direction connecting the reactant inlet manifold and the reactant outlet manifold.

According to one more variant, the membrane electrode assembly comprises a gas diffusion layer covering said first electrode and partially covering said second band.

According to another variant, said reliefs include flat surfaces, the width and length of which are at least equal to the width of a reactant flow channel.

According to one more variant, said intermediate zone includes a third band in which a volume is made between the first and second sheets for the coolant.

According to yet another variant, said outer face of the first sheet comprises second ribs delimiting said reactant flow channels, and in which the intermediate zone comprises third ribs extending between one of said second ribs and the first rib.

According to one variant, the first and second sheets form, in the second band, an alternation of coolant storage volumes and zones in which the first and second sheets are in contact.

According to another variant, a direction connecting the coolant inlet manifold to the coolant outlet manifold is substantially perpendicular to a direction connecting the reactant inlet manifold and the reactant outlet manifold.

According to one more variant, the outer face of the first sheet comprises a reactant homogenizing zone made between one of said reactant manifolds and said reactant flow channels, said intermediate zone being made in the reactant homogenizing zone.

According to yet another variant, the outer face of the first sheet comprises first reactant homogenizing channels delimited by respective fourth ribs and in which the outer face of the second sheet comprises second reactant homogenizing channels delimited by respective fifth ribs, said first homogenizing channels extending along directions different from those of the second homogenizing channels, said first homogenizing channels comprising indentations forming respective studs on the inner face of the first sheet in said first band of the intermediate zone, said studs being housed in the internal volume of the fifth ribs, said second homogenizing channels comprising indentations forming respective studs on the inner face of the second sheet in said first band of the intermediate zone, said studs being housed in the internal volume of the fourth ribs.

According to one variant, homogenizing studs are made on the inner faces of the first and second sheets directly below or plumb with said homogenizing zone, homogenizing studs of the first and second sheets being in contact.

According to another variant, said first rib extends between the reactant inlet and outlet manifolds.

Other features and advantages of the invention will become clearly apparent from the description that is given thereof below, by way of nonlimiting illustration, and with reference to the appended figures, in which:

FIGS. 10 and 11 are longitudinal sectional views of a rib of the plate from FIG. 3 according to the third variant, respectively at rest and under stress;

FIGS. 12 to 14 are highly enlarged cross-sectional views;

FIG. 15 is a perspective view of a plate from FIG. 3 according to a fourth variant, at rest;

FIG. 16 is a perspective view of a plate from FIG. 3 according to a fifth variant, at rest;

FIG. 17 is a top view of an example of a fuel cell stack configuration using a bipolar plate according to FIG. 3;

FIG. 23 is a top view of a first variant of a bipolar plate of an electrochemical cell according to a fourth aspect of the invention;

FIGS. 24 to 29 are sectional views of the bipolar plate from FIG. 23;

FIG. 34 is a top view of the bipolar plate from FIG. 33;

FIG. 35 is a broken sectional view of the bipolar plate from FIG. 33;

FIG. 36 is an exploded perspective view of a third variant of a bipolar plate of an electrochemical cell according to the fourth aspect of the invention;

FIGS. 38 and 39 are respectively top and bottom views of the bipolar plate from FIG. 37;

FIG. 40 is an exploded side view of the bipolar plate from FIG. 37;

FIGS. 41 and 42 are exploded sectional views along two different cutting planes;

Figure 1:
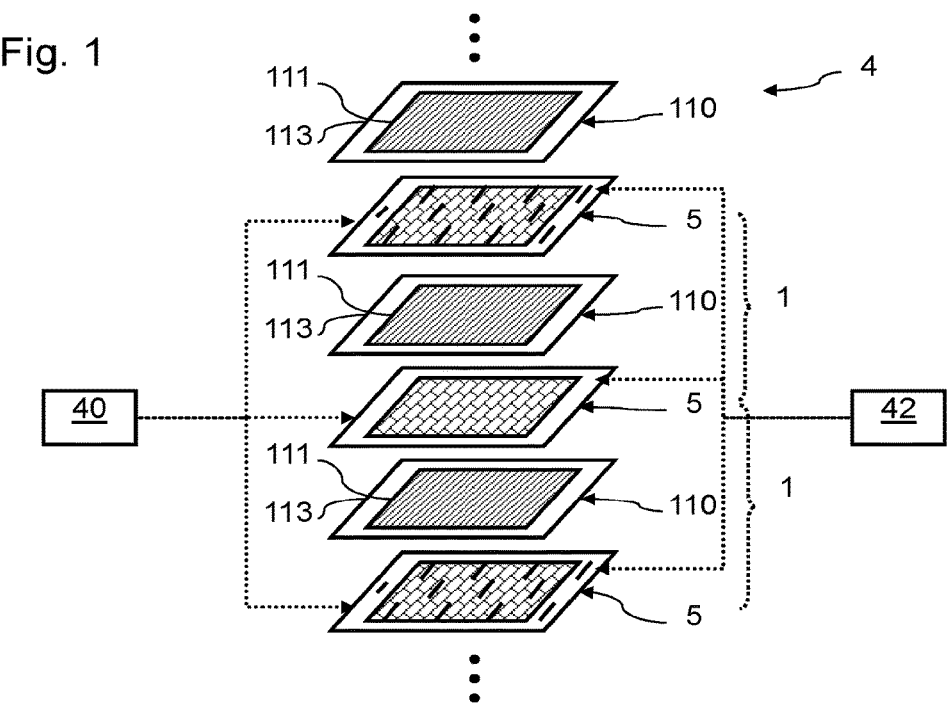
FIG. 1 is an exploded perspective view of an example of a stack of membrane electrode assemblies and of bipolar plates for a fuel cell stack.

FIG. 1 is a schematic exploded perspective view of a stack of cells 1 of a fuel cell stack 4. The fuel cell stack 4 comprises several superposed cells 1. The cells 1 are of proton exchange membrane or polymer electrolyte membrane type.

The fuel cell stack 4 comprises a source of fuel 40. The source of fuel 40 here supplies an inlet of each cell 1 with molecular hydrogen. The fuel cell stack 4 also comprises a source of oxidant 42. The source of oxidant 42 here supplies an inlet of each cell 1 with air, the oxygen from the air being used as oxidant. Each cell 1 also comprises exhaust channels. One or more cells 1 also have a cooling circuit.

Each cell 1 comprises a membrane electrode assembly 110 or MEA 110. A membrane electrode assembly 110 comprises an electrolyte 113, a cathode (not illustrated) and an anode 111 which are placed on either side of the electrolyte and fastened to this electrolyte 113. The layer of electrolyte 113 forms a semi-permeable membrane that allows protons to be conducted while being impermeable to the gases present in the cell. The layer of electrolyte also prevents passage of electrons between the anode 111 and the cathode.

Between each pair of adjacent MEAs, a bipolar plate 5 is positioned. Each bipolar plate 5 defines anodic flow channels and cathodic flow channels on opposite outer faces. Bipolar plates 5 advantageously also define coolant flow channels between two successive membrane electrode assemblies. The bipolar plates 5 may each be formed in a manner known per se from two assembled conductive metal sheets, for example made of stainless steel, or made of titanium alloy, aluminium alloy, nickel alloy or tantalum alloy. Each sheet then defines one respective outer face. The bipolar plates 5 may also be obtained by any other process, for example moulding or injection using carbon-polymer composites. The bipolar plates 5 may thus also be formed from one piece. The outer faces of the bipolar plate 5 are then defined by such a one-piece part.

The stack may also comprise peripheral gaskets and membrane reinforcements that are not illustrated here. Each cell 1 may additionally comprise a gas diffusion layer (not illustrated) positioned between the anode and a bipolar plate, and another gas diffusion layer positioned between the cathode and another bipolar plate.

In a manner known per se, during the operation of the fuel cell stack 4, air flows between an MEA and a bipolar plate, and molecular hydrogen flows between this MEA and another bipolar plate. At the anode, the molecular hydrogen is ionized in order to produce protons that pass through the MEA. The electrons produced by this reaction are collected by a bipolar plate 5. The electrons produced are then applied to an electrical load connected to the fuel cell stack 4 in order to form an electric current. At the cathode, oxygen is reduced and reacts with the protons to form water. The reactions at the anode and the cathode are governed as follows:

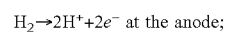

$H_2 \rightarrow 2H^+ + 2e^-$ at the anode;

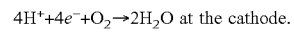

$4H^+ + 4e^- + O_2 \rightarrow 2H_2O$ at the cathode.

During its operation, one cell of the fuel cell stack usually generates a DC voltage between the anode and the cathode of the order of 1 V.

Figure 2:
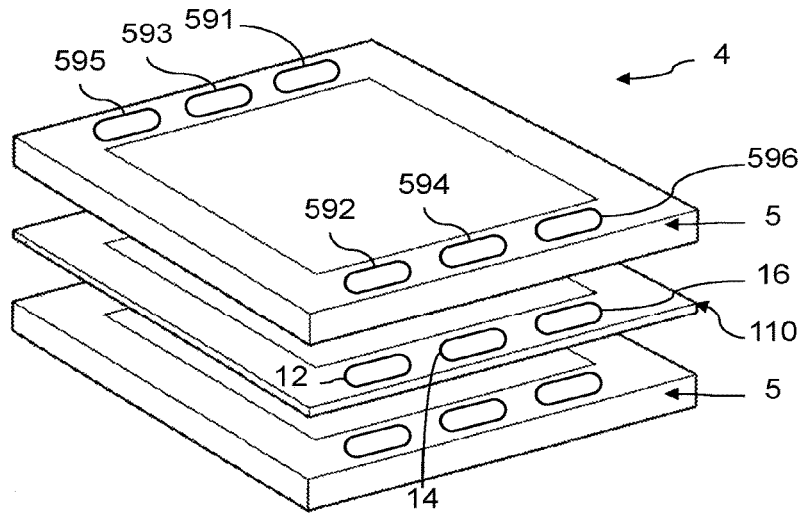
FIG. 2 is an exploded perspective view of bipolar plates and of a membrane electrode assembly that are intended to be stacked in order to form flow manifolds through the stack.

FIG. 2 is a schematic exploded perspective view of two bipolar plates 5 and of a membrane electrode assembly that are intended to be included in the stack of the fuel cell stack 4. The stack of the bipolar plates 5 and of the membrane electrode assemblies 110 is intended to form a plurality of flow manifolds, the arrangement of which is illustrated here in a schematic manner only. For this purpose, respective orifices are made through the bipolar plates 5 and through the membrane electrode assemblies 110. The bipolar plates 5 thus comprise orifices 591, 593 and 595 at a first end, and orifices 592, 594 and 596 at a second end opposite the first. The orifice 591 is used for example to form a fuel supply manifold, the orifice 596 is used for example to form a discharge manifold for discharging residues of combustion and of unused fuel, the orifice 593 is used for example to form a coolant supply manifold, the orifice 594 is used for example to form a coolant discharge manifold, the orifice 592 is used for example to form an oxidant supply manifold, and the orifice 595 is used for example to form a discharge manifold for discharging produced water and unused oxidant.

The orifices of the bipolar plates 5 and of the membrane electrode assemblies 110 are positioned opposite in order to form the various flow manifolds. Orifices 12, 14 and 16 are for example made in the membrane electrode assemblies 110 and are positioned opposite respectively the orifices 592, 594 and 596. For the sake of simplification, the orifice 596 will be likened to a discharge manifold for discharging combustion residues from the stack.

Figure 3:
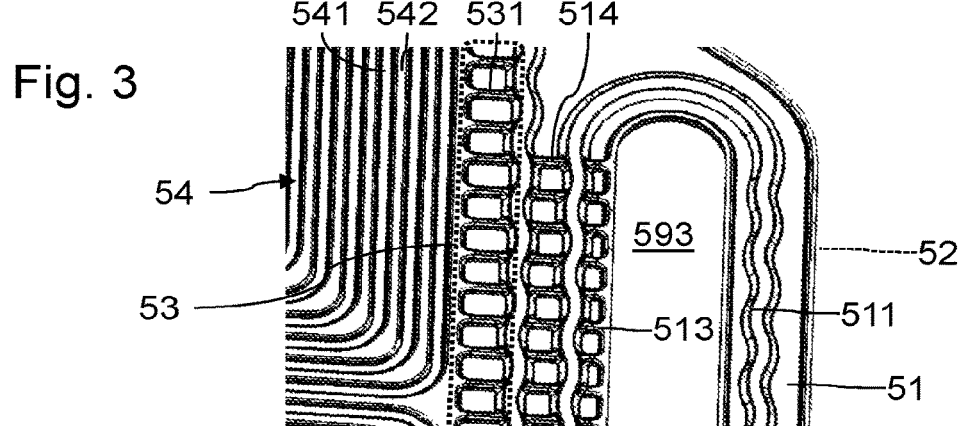
FIG. 3 is a perspective view of a bipolar plate according to one embodiment of a first aspect of the invention.

FIG. 3 is a perspective view of a detail of the upper face of a bipolar plate 5 according to one embodiment of a first aspect of the invention. The bipolar plate 5 comprises attached conductive sheets 51 and 52. The conductive sheets 51 and 52 are typically formed of metal sheets, for example embossed metal sheets. The sheets 51 and 52 are for example formed of stainless steel. The sheets 51 and 52 are for example attached by welding. Coolant flow channels are made between the sheets 51 and 52 and are in communication with the manifolds 593 and 594. The sealing of the coolant flow channels may be obtained by welds between the sheets 51 and 52.

The outer face of the sheet 51 comprises ribs 542 that delimit flow channels 541 for a reactant, for example the fuel. The flow channels 541 are here intended to place the manifolds 591 and 596 in communication. The zone comprising the flow channels 541 corresponds to the reactive zone 54 of the electrochemical cell.

The outer face of the sheet 51 also comprises a rib 512 extending between the manifolds 591 and 596. The rib 512 is intended to form a support for a gasket (not illustrated here) extending between the manifolds 591 and 596. The rib 512 and the gasket are intended to prevent leakages of fuel out of the electrochemical cell.

The outer face of the sheet 51 also comprises an intermediate zone 53, positioned between the rib 512 and a rib 542 of the periphery of the reactive zone. The intermediate zone 53 is intended to receive an overlap of the membrane 113 or an overlap of a gas diffusion layer beyond the reactive zone. The width of the intermediate zone 53 is intended to take into account the various manufacturing and assembly tolerances, for example the tolerances for positioning the membrane 113 or a gas diffusion layer, or tolerances linked to the embossing of a sheet. The intermediate zone 53 comprises an alternation of ribs 531 and of indentations 532. The ribs 531 extend between the rib 512 and the rib 542 of the periphery of the reactive zone. The ribs 531 extend perpendicular to an axis connecting the manifolds 591 and 596. In this example, the ribs 531 extend perpendicular to the rib 512, and perpendicular to the rib 542 of the periphery of the reactive zone. A contact between the sheets 51 and 52 is created in the indentations 532.

The outer face of the sheet 51 also comprises a rib 511 surrounding the manifold 593. This rib 511 is intended to form a support for a gasket surrounding the manifold 593. Ribs 513 allow a flow of coolant from the manifold 593 to under the rib 511. The outer face of the sheet 51 also comprises ribs 514 extending between the rib 512 and the rib 513. The ribs 514 allow a flow of coolant between the inner face of the rib 513 and the inner face of the rib 512. The ribs 531 allow a flow of coolant from the inner face of the rib 512 into the coolant flow channels, positioned directly below or plumb with the reactive zone.

The intermediate zone 53 is a zone subject to reactant short-circuits. The ribs 531 make it possible to reduce the potential flow area for the reactants, even with a reduced overlap of the gas diffusion layer or of the membrane in the zone 53. In order to further limit the flow area for the reactants, the ribs 531 have a height greater than that of the ribs 542. Thus, an overlap of the gas diffusion layer or of the membrane in the zone 53 is compressed, so as to assist with closing off the short-circuit in this zone 53. The height of each rib will be defined as the distance measured from a mid-plane in which the sheets 51 and 52 are in contact, up to the top of this rib.

In this example, the general flow direction of reactant (defined by a straight line connecting the manifolds 591 and 596) is perpendicular to the flow direction of coolant (defined by a straight line connecting the manifolds 593 and 594), as illustrated in FIG. 17. An intermediate zone is here referenced schematically, in the absence of illustration of peripheral gaskets.

It is desirable to limit the compression on an overlap of the gas diffusion layer or of the membrane 113 in the zone 53, to avoid risks of rupture of the membrane by increase in internal shear stresses, or to avoid a large increase in the conductivity of the gas diffusion layer in the overlap, able to create local heterogeneities of current density. For this purpose, the ribs 531 are flexible, so that a pressure applied on their top brings this top close to the mid-plane between the sheets 51 and 52.

Ribs 531 according to various variants are illustrated in cross section in FIGS. 4 to 7, at the middle portion thereof. The geometry of these ribs 531 is given in more detail in FIGS. 12 to 14. All these ribs have a top 556. Each rib 531 has junctions 551 with the adjacent indentations 532, positioned on either side of this rib 531. The point 558 illustrates the point of contact, between the sheet 51 and the sheet 52, closest to the top 556. To promote the bending of the rib 531, at least one portion of each junction 551 is positioned set back relative to a straight line connecting the top 556 to this closest point of contact 558.

The ribs 531 advantageously have cross sections that bear out this definition over at least 50% of their length, advantageously over at least 70% of their length, in order to promote their deformation when a pressure is applied to their top.

Figure 4:
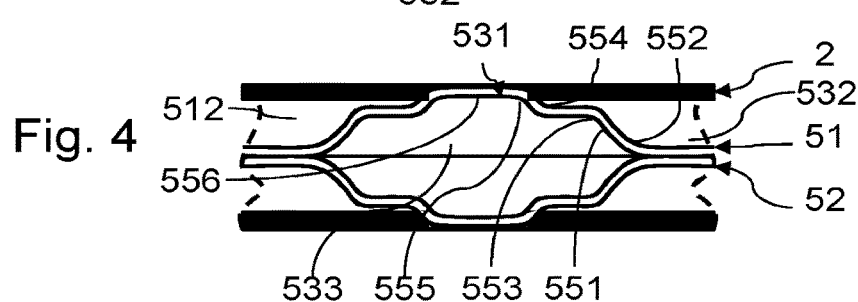
FIG. 4 is a cross-sectional view of a rib of the plate from FIG. 3 according to a first variant.

The example illustrated in FIG. 4 corresponds to a first variant of a rib 531. The rib 531 illustrated here is at rest, in the absence of stress on its top 556. In this variant, each junction 551 has a first curve 552, a second curve 553, a third curve 554 and a fourth curve 555. The curves 552 to 555 are connected by unreferenced substantially rectilinear portions. Each junction 551 has a point of inflection between its successive curves. Thus, as illustrated in this variant, the junctions 551 advantageously have at least three points of inflection, in order to promote a depression of the top 556 when a pressure is applied to it, by bending of the rib 531.

The rib 531 illustrated here has a flat top 556. Advantageously, as illustrated in this variant, a rib 531 has a flat top 556 over at least 25% of its width, in order to provide a good bearing surface to a membrane or to a gas diffusion layer.

To promote a uniform depression of the ribs 531 during the application of a pressure on their top 556, their cross section advantageously has an axis of symmetry, as illustrated in this variant. Advantageously, the ribs 531 have an extrusion shape over their middle portion, that is to say an elongated shape of constant cross section.

Figure 5:
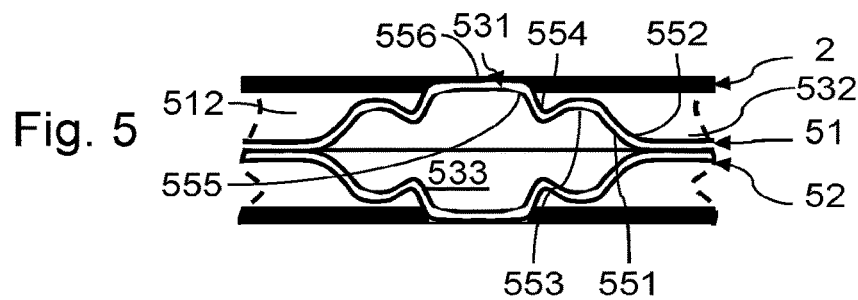
FIG. 5 is a cross-sectional view, at rest, of a rib of the plate from FIG. 3 according to a second variant.
Figure 6:
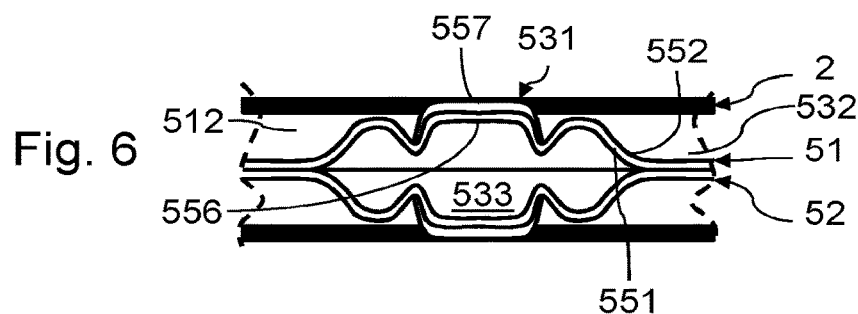
FIG. 6 is a cross-sectional view, under stress, of a rib of the plate from FIG. 3 according to the second variant.
Figure 8:
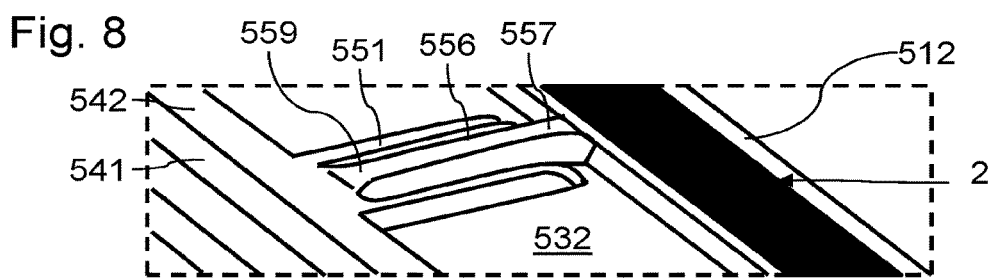
FIGS. 8 and 9 are perspective views of a plate from FIG. 3 according to the third variant, respectively at rest and under stress.
Figure 9:
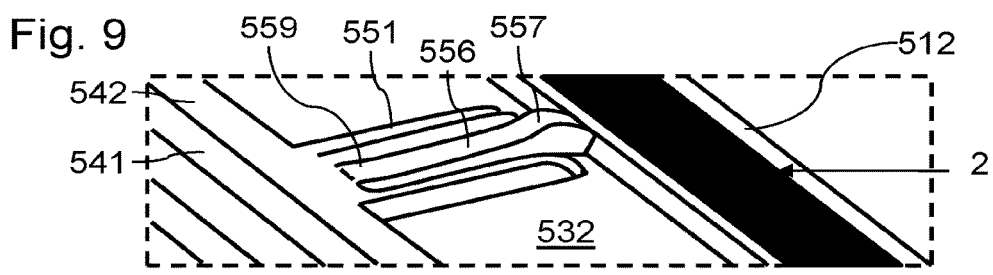

The example illustrated in FIG. 5 corresponds to a second variant of a rib 531, here illustrated at rest. This configuration is also illustrated in perspective in FIG. 8 and in longitudinal section in FIG. 10. FIG. 6 corresponds to this very rib 531 during the application of a pressure on its top 556. This configuration is also illustrated in perspective in FIG. 9 and in longitudinal section in FIG. 11. In this variant, each junction 551 has a first curve 552, a second curve 553, a third curve 554 and a fourth curve 555. The curves 552 to 555 are connected by unreferenced curved portions. Thus, the junctions 551 each include at least one S shape. Such a shape promotes a depression of the top 556 when a pressure is applied to it, in order to adopt for example the configuration illustrated in FIGS. 6 and 11.

The rib 531 has one end 557 by which it is connected to the rib 512, and one end 559 by which it is connected to the rib 542. The ends 557 and 559 may form transition zones that make it possible to pass gradually from the height of the ribs 512 and 542 respectively, to the height of the middle portion of the rib 531. The end 559 may form a gradual transition zone over a length advantageously of between 2 and 10 times Δh, Δh being the difference in height at rest between the rib 531 and the ribs 542. The end 559 may form a gradual transition zone of shorter length than the end 557, in order to limit as much as possible the flow in the zone 53. This gradual transition zone of the end 557 may advantageously have a length of between 1 and 5 times Δh.

A rib 531 that is too wide at its junction with the rib 512 may impair the mechanical strength of this rib 512. In the variant illustrated in FIG. 8, junctions 551 of the rib 531 are interrupted before reaching the rib 512. A distance of between 1 and 5 times Δh may for example be made between the junctions 551 and the rib 512.

FIG. 11 illustrates in particular the partial depression of the rib 531 by a membrane electrode assembly comprising a gas diffusion layer 121. The gas diffusion layer 121 has an overlap directly above or plumb with the zone 53. At the overlap, the compression applied on the middle portion of the rib 531 by the gas diffusion layer 121 makes it possible to depress this middle portion of the rib 531, which makes it possible to preserve the membrane 113 and the gas diffusion layer 121. In the example, the middle portion of the rib 531 is depressed until it is lower than the rib 542 in particular. Beyond the overlap, the end 557 of the rib 531 remains higher than the ribs 512 and 542 and promotes the closing off of the zone 53. Each junction 551 has a point of inflection between its successive curves.

In this variant, the curve 553 forms a local top that advantageously has the same height as the ribs 542. Thus, the curve 553 also assists with blocking a flow of fluid in the zone 53.

Figure 7:
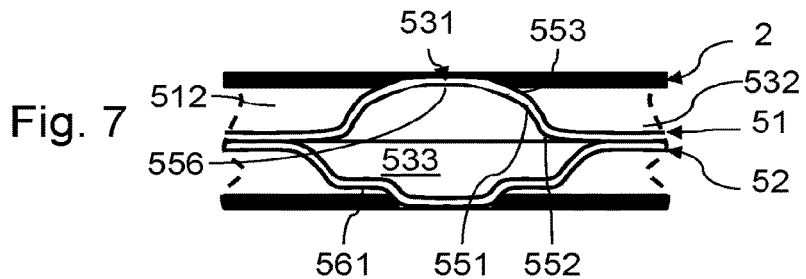
FIG. 7 is a cross-sectional view, at rest, of a rib of the plate from FIG. 3 according to a third variant.

The example illustrated in FIG. 7 corresponds to a third variant of a rib 531, here illustrated at rest. In this variant, each junction 551 has a first curve 552 and a second curve 553.

In order to promote a depression of the top 556 when a pressure is applied to it, the first curve 552 and a portion of the adjacent indentation 532 are positioned in an unstable position with respect to the point of contact 558. This first curve 552 and this portion of the indentation 532 are not supported directly by the sheet 52. This allows a depression of the rib 531 into a rib 561 of the sheet 52 positioned opposite, during the application of a pressure on this rib 531. For this purpose, the rib 561 here has a width greater than the rib 531 and is not therefore the mirror image of this rib 531 relative to the mid-plane. A greater stiffness of the ribs 561 may for example be desired.

FIG. 15 is a perspective view of another variant, in which the junctions 551 extend to the rib 512. But in this variant, the ends of the junctions 551 are separated from the rib 531 and branch off sideways. Thus, the rib 531 has several independent junctions with the rib 512, which makes it possible to stiffen this rib. Advantageously, the junctions 551 are separated from the rib 531 by a distance of between 2 and 10 times Δh.

FIG. 16 is a perspective view of another variant, in which the middle portion of each rib 531 has different cross sections. Each rib 531 has two slightly stiffer sections positioned respectively between the centre of the rib and the end 557, and between the centre of the rib 531 and the end 559. At its centre, the rib 531 has a cross section having a lower inertia, in order to have a lower stiffness. Thus, depending on the length of overlap of a gas diffusion layer on top of the zone 53, a depression of the rib 531 at the end 559 does not necessarily lead to a depression of the rib 531 at the end 557. Thus, if the overlap of the gas diffusion layer does not exceed the centre of the rib 531, this rib 531 is only slightly bent at the end 557, which makes it possible to guarantee an optimal closing off of the flow in the zone 53.

In the preceding examples, the geometry of the sheet 51 has been described in detail. Such a sheet geometry proves particularly suitable for flow channels 541 of molecular hydrogen fuel, the viscosity of which is very low, molecular hydrogen thus being particularly affected by a short-circuit flow. Although not described in detail, the sheet 52 may have a geometry similar to the sheet 51, with an alternation of flexible ribs and of indentations in an intermediate zone, as described in detail above for the sheet 51. In the variants illustrated in FIGS. 4 to 6, ribs of the sheet 52 are the mirror image of ribs 531 relative to the mid-plane of the bipolar plate 5.

Advantageously, the ribs 531 are uniformly distributed in the zone 53. Advantageously, the width of the indentations 532 is at least equal to the width of the ribs 531. Advantageously, the width of the indentations 532 is at most equal to 2 times the width of the ribs 531.

The width of the ribs 531 could advantageously be between 1 and 3 mm. The width of the zone 53 could advantageously be between 3 and 7 mm.

Δh will advantageously be at least equal to half of the thickness EpGdl of the gas diffusion layer 121, and at most equal to 3 times EpGdl. Advantageously, Δh is between 0.9*EpGdl and 1.1*EpGdl. Δh may be expressed as the mean value over the length of the rib 531, it being possible for the rib 531 to have a non-uniform height over its length.

Figure 10:
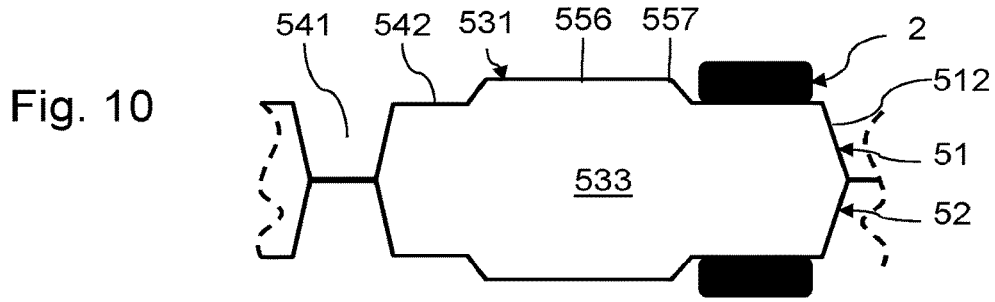

In the examples illustrated in FIGS. 4 to 14, a gasket 2 is positioned in contact on the rib 512. The gasket 2 could for example be a flat gasket or a gasket screen-printed on the rib 512. The gasket 2 may for example be in contact with the membrane 113 as illustrated in FIGS. 10 and 11, or be in contact with a reinforcement that is not illustrated, fastened to the periphery of the membrane 113.

Figure 18:
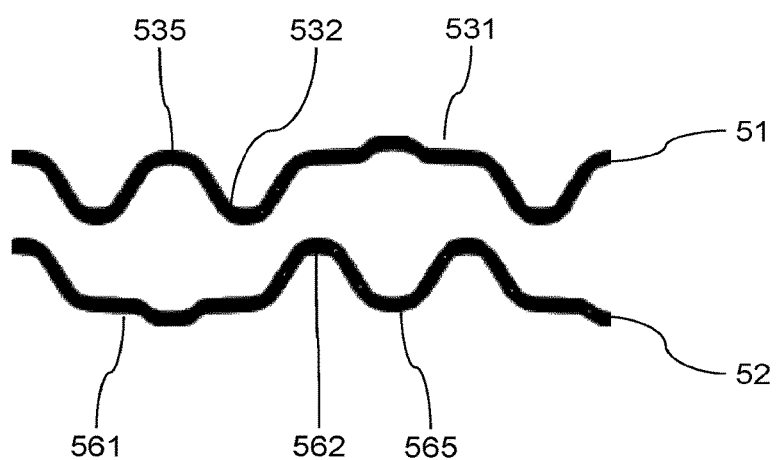
FIG. 18 is an exploded cross-sectional view of a plate from FIG. 3 according to a sixth variant, at rest.

FIG. 18 is a cross-sectional view that is exploded (for greater clarity) at ribs 531 of another variant of the first aspect of the invention. The points of contact between a rib 531 and the sheet 52 are here housed on the very inside of the rib 531. These points of contact are therefore raised relative to a mid-plane of the sheets 51 and 52. The position of these points of contact and the geometry of the ribs 531 satisfy the first aspect of the invention, with at least one portion of each junction positioned set back relative to a straight line connecting the top of one rib 531 to the closest point of contact with the sheet 52. Thus the bending of the rib 531 is promoted.

The sheet 52 comprises an intermediate zone superposed on the intermediate zone 53. The intermediate zone of the sheet 52 comprises an alternation of ribs 561 and of indentations 562. The sheet 52 also comprises reactant flow channels that are not illustrated, delimited by ribs. A contact between the sheets 51 and 52 is created in the indentations 532, and also in the indentations 562. At the indentations 532, secondary ribs 535 are arranged. These secondary ribs 535 have a certain stiffness relative to a depression. The secondary ribs 535 also make a space that enables the depression of the middle portion of a rib 531. At the indentations 562, secondary ribs 565 are arranged. The secondary ribs 565 have a certain stiffness relative to a depression. The secondary ribs 565 also make a space that enables the depression of the middle portion of a rib 531. This variant makes it possible in particular to increase the stiffness of the gasket support ribs.

Figure 19:
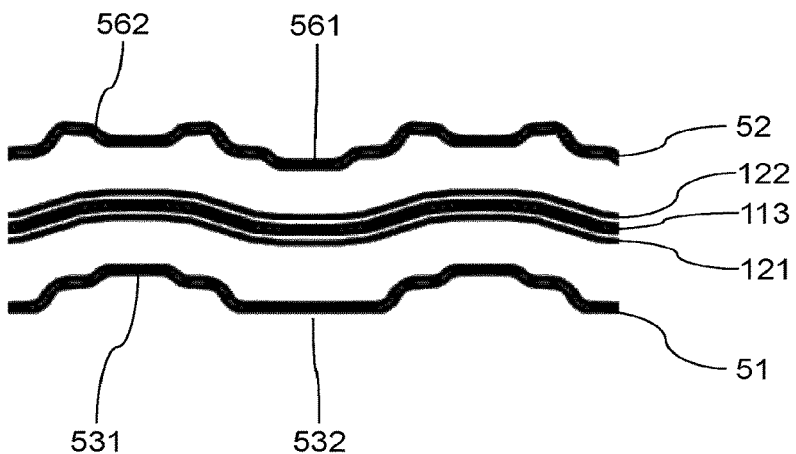
FIG. 19 is a cross-sectional view of an embodiment of an electrochemical cell according to a second aspect of the invention.
Figure 20:
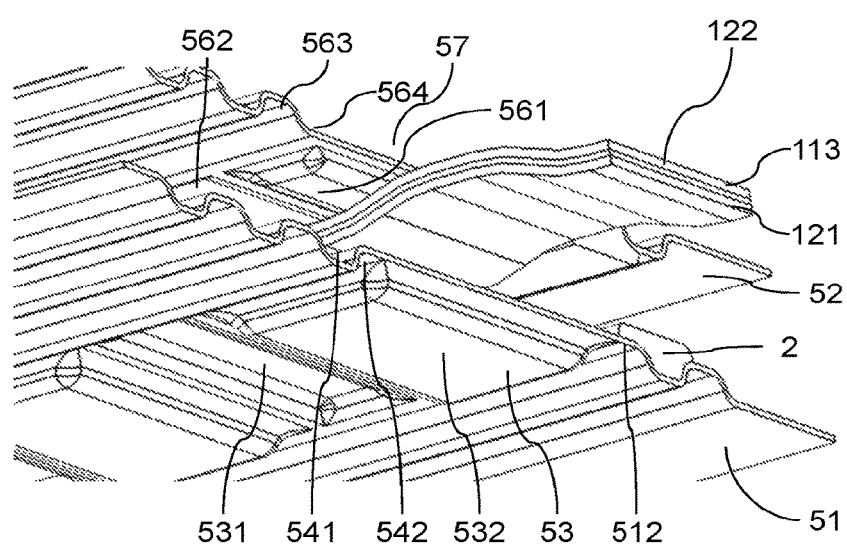
FIG. 20 is an exploded perspective view of another variant of the electrochemical cell of the second aspect of the invention.

According to a second aspect of the invention illustrated in FIGS. 19 and 20, the invention also relates to an electrochemical cell comprising a membrane electrode assembly compressed between two bipolar plates.

According to this second aspect of the invention, electrochemical cells also comprise bipolar plates 5. Each bipolar plate 5 comprises attached conductive sheets 51 and 52. The conductive sheets 51 and 52 may also be formed from embossed metal sheets attached by welding. Coolant flow channels are made between the sheets 51 and 52 and are in communication with coolant inlet and outlet manifolds as described in detail above.

A first variant of this second aspect of the invention is illustrated in FIG. 19, in a cross-sectional view through the ribs 531. The first and second aspects of the invention are combined in this example. As in the examples described in detail above, the outer face of the sheet 51 comprises ribs 542 delimiting flow channels 541 for a reactant. These flow channels 541 are intended to place the reactant inlet and outlet manifolds in communication, as described in detail above.

As in the examples described in detail above, the outer face of the sheet 51 also comprises a rib 512 extending between the reactant manifolds, this rib being intended to form a support for a gasket 2 and extending between these reactant manifolds.

The outer face of the sheet 51 also comprises an intermediate zone 53, positioned between the gasket support rib 512 and a rib 542 of the periphery of the reactive zone. The intermediate zone 53 is a zone subject to reactant short-circuits. The intermediate zone 53 is here too intended to receive an overlap of the membrane 113 or an overlap of a gas diffusion layer 121 or 122 beyond the reactive zone.

The width of the intermediate zone 53 is also intended to take into account the various manufacturing and assembly tolerances, for example the tolerances for positioning the membrane 113 or a gas diffusion layer, or tolerances linked to the embossing of a sheet. The intermediate zone 53 comprises an alternation of ribs 531 and of indentations 532, as in the preceding examples. The ribs 531 extend between the rib 512 and the rib 542 of the periphery of the reactive zone. The ribs 531 extend perpendicular to an axis connecting the reactant manifolds. In this example, the ribs 531 extend perpendicular to the rib 512, and perpendicular to the rib 542 of the periphery of the reactive zone. A contact between the sheets 51 and 52 is created in the indentations 532. The ribs 531 make it possible to reduce the potential flow area for the reactants, even with a reduced overlap of the gas diffusion layer or of the membrane in the zone 53.

The overlap of the MEA in the zone 53 comprises an undulation via its alternate contacts with ribs 531 and 561 of the sheets 51 and 52 respectively. The sheet 52 comprises a support rib for a gasket. The sheet 52 comprises an (unreferenced) intermediate zone superposed on the intermediate zone 53. The intermediate zone of the sheet 52 comprises an alternation of ribs 561 and of indentations 562. The sheet 52 also comprises reactant flow channels delimited by ribs. The ribs 561 extend between the gasket support rib and the rib 562 of the periphery of the reactive zone.

In order to limit a possible overcompression of the membrane 113 (or where appropriate of a reinforcement) in the zone 53, in particular when the overlap of the gas diffusion layer is close to the rib 512, the second aspect of the invention proposes to position each rib 531 of a sheet 51 of a bipolar plate 5 opposite a wider indentation 562 made in a sheet 52 of another bipolar plate. A rib 561 of the sheet 52 of the other bipolar plate 5 is opposite an indentation 532 of the sheet 51. Such a configuration aims to create a contact of the overlap of the MEA 110 in the zone 53, with an alternation of ribs 531 and of ribs 561, in order to limit the flow area in the zone 53. Such ribs 531 and 561 make it possible to generate an undulation on the overlap of the MEA 110, rather than an excessive compression thereof.

The points of contact between a rib 531 and the sheet 562 are here housed on the very inside of the rib 531. These points of contact are therefore raised relative to a mid-plane of the sheets 51 and 52. The position of these points of contact and the geometry of the ribs 531 satisfy the first aspect of the invention, with at least one portion of each junction positioned set back relative to a straight line connecting the top of one rib 531 to the closest point of contact. Thus the bending of the rib 531 is promoted.

In order to allow an undulation of the overlap of the MEA:
  each rib 531 is opposite an indentation 562 of greater width;
  each rib 561 is opposite an indentation 532 of greater width;
  the height of the ribs 531 is greater than the height of the ribs 542;
  the height of the ribs 561 is greater than the height of the ribs delimiting the flow channels of the sheet 52.

In order to limit the stresses on the overlap of the MEA, advantageously:
  the space between a rib 531 and an indentation 562 is greater than the thickness of the overlap of the MEA;
  the space between a rib 561 and an indentation 532 is greater than the thickness of the overlap of the MEA.

FIG. 20 is a perspective bottom view that is exploded (for greater clarity) of another variant of the second aspect of the invention. It is possible to distinguish an overlap of an MEA positioned in a zone 53 between a sheet 51 and a sheet 52 of two adjacent bipolar plates 5. The MEA comprises an undulation via its alternate contacts with ribs 531 and 561 of the sheets 51 and 52 respectively. The sheet 52 comprises a support rib for a gasket. The sheet 52 comprises an intermediate zone 57 superposed on the intermediate zone 53. The intermediate zone comprises an alternation of ribs 561 and of indentations 562. The sheet 52 also comprises reactant flow channels 563 delimited by ribs 564. The ribs 561 extend between the gasket support rib and the rib 562 of the periphery of the reactive zone.

In order to allow an undulation of the overlap of the MEA:
  each rib 531 is opposite an indentation 562 of greater width;
  each rib 561 is opposite an indentation 532 of greater width;
  the height of the ribs 531 is greater than the height of the ribs 542;
  the height of the ribs 561 is greater than the height of the ribs 564.

In order to limit the stresses on the overlap of the MEA, advantageously:
  the space between a rib 531 and an indentation 562 is greater than the thickness of the overlap of the MEA;

the space between a rib 561 and an indentation 532 is greater than the thickness of the overlap of the MEA.

Figure 21:
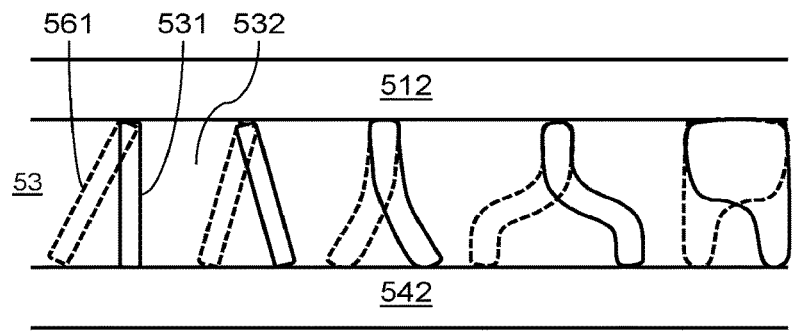
FIG. 21 is a schematic top view of various combinations of ribs according to a third aspect of the invention.

A third aspect of the invention is illustrated in FIG. 21, corresponding to a schematic top view of various configurations of ribs 531 (solid line) and 561 (broken line) of the sheets 51 and 52. According to this third aspect of the invention, the ribs 531 and 561 are not superposed at their end positioned on the side of the rib 542. It is thus possible to create an undulation of a portion of an overlap of the MEA in the intermediate zone 53. The ribs 531 are on the other hand superposed at their end positioned on the side of the rib 512, in order to limit the short-circuit flow area in the intermediate zone 53, if the overlap does not reach this superposition. A possible overcompression of an overlap reaching on the other hand the superposition of ribs is only induced in the vicinity of the rib 512. The ribs 531 and/or the ribs 561 may take up the various features described in detail with reference to the other variants of the first aspect of the invention.

According to a fourth aspect of the invention, illustrated in FIGS. 23 to 36, the invention also relates to an electrochemical cell comprising a membrane electrode assembly compressed between two bipolar plates. According to the fourth aspect of the invention, it is desired to reduce the short-circuit flow for the coolant and for the reactant, while retaining a store of coolant outside of the reactive zone. According to the fourth aspect of the invention, the flow is blocked between the coolant flow channels of the reactive zone and coolant storage zones outside of the reactive zone.

Figure 22:
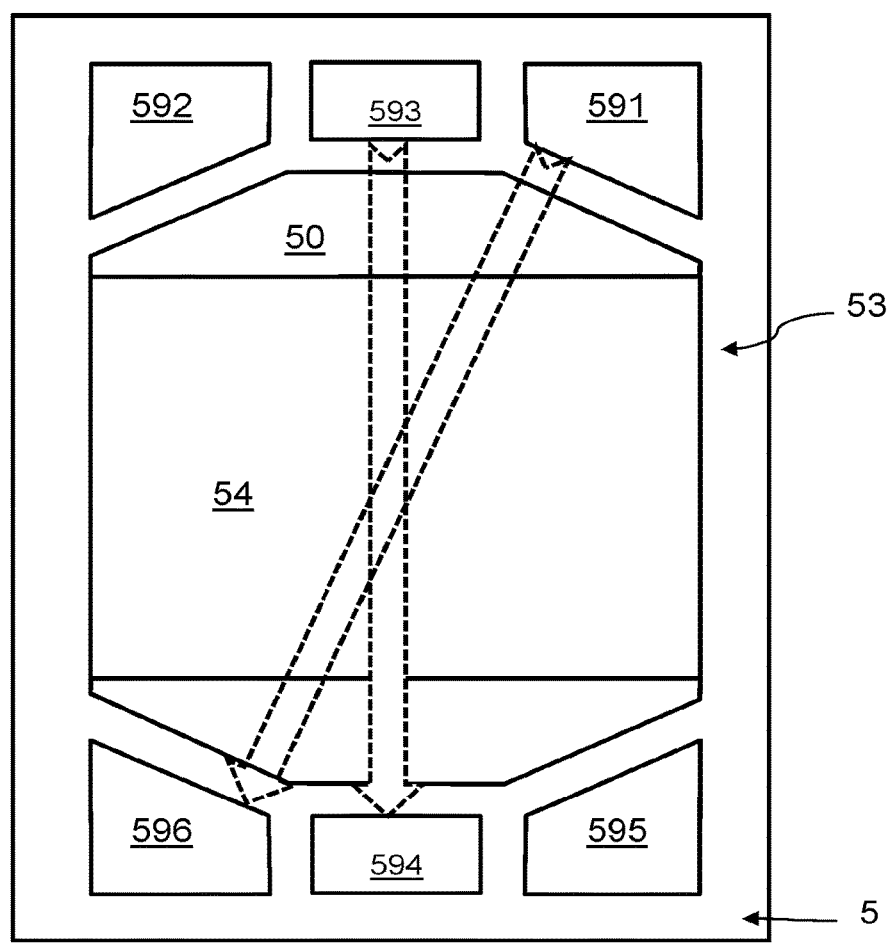
FIG. 22 is a top view of another example of a fuel cell stack configuration.
Figure 30:
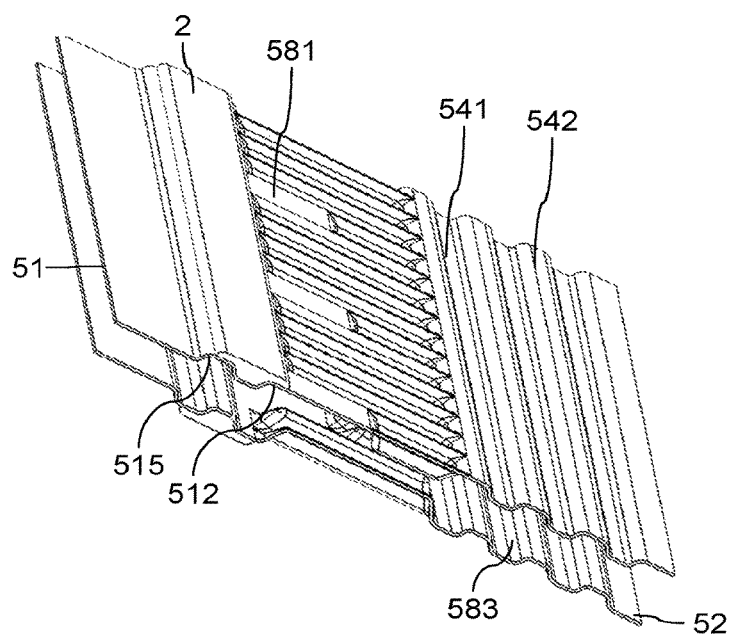
FIG. 30 is an exploded perspective view of the bipolar plate from FIG. 23.

In the configuration illustrated as a top view in FIG. 22, the coolant flow is substantially parallel to the flow of reactants. In this scenario, according to the prior art, a short-circuit coolant flow takes place plumb with the intermediate zone 53, in the same way as a reactant short-circuit flow.

According to this fourth aspect of the invention, electrochemical cells also comprise bipolar plates 5. Each bipolar plate 5 comprises attached conductive sheets 51 and 52. The conductive sheets 51 and 52 may also be formed from embossed metal sheets attached by welding. Coolant flow channels are made between the sheets 51 and 52 and are in communication with coolant inlet and outlet manifolds as described in detail above. In the fourth aspect of the invention, each bipolar plate 5 comprises an intermediate zone between an electrode covering reactant flow channels, and a rib extending between the reactant inlet and outlet manifolds and on which a gasket is positioned. In this intermediate zone:
- the sheets 51 and 52 have complementary shapes nested one in the other over the entire length of at least one coolant flow channel, along a first band;
- the sheet 51 comprises reliefs in contact with the membrane electrode assembly, in order to form a second band positioned between the first band and the gasket support rib. A coolant storage volume is made between the sheets 51 and 52 in this second band.

A first variant of the fourth aspect of the invention, corresponding to the configuration illustrated in FIG. 22, is illustrated in FIGS. 23 to 32. The coolant flow direction here is substantially parallel to the flow direction of the reactants.

The outer face of the sheet 51 comprises ribs 542 that delimit flow channels 541 for a reactant, for example the fuel. The flow channels 541 are here intended to place the manifolds 591 and 596 in communication. The zone comprising the flow channels 541 corresponds to the reactive zone 54 of the electrochemical cell.

The outer face of the sheet 51 also comprises ribs 512 and 515 extending between the manifolds 591 and 596. The ribs 512 and 515 are intended to form a support for a gasket 2 extending between the manifolds 591 and 596. The gasket 2 here is straddling the ribs 512 and 515, and also in a groove made between the ribs 512 and 515.

The outer face of the sheet 51 also comprises an intermediate zone 53, positioned between the rib 512 and a rib 542 of the periphery of the reactive zone 54.

Figure 31:
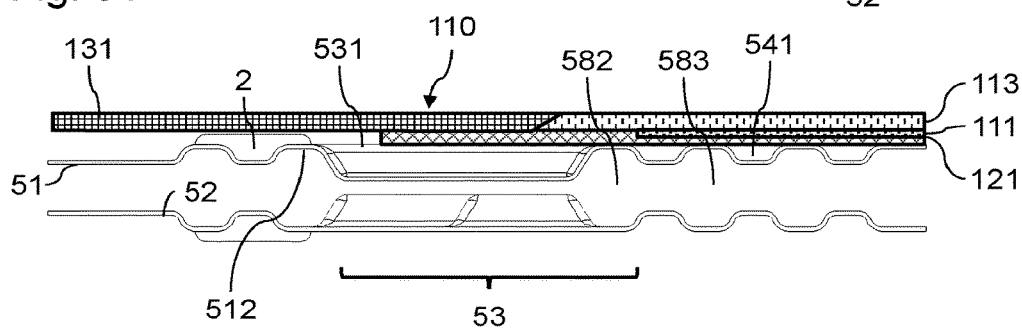
FIG. 31 is a cross-sectional view of the bipolar plate from FIG. 23 combined with a membrane electrode assembly.
Figure 32:
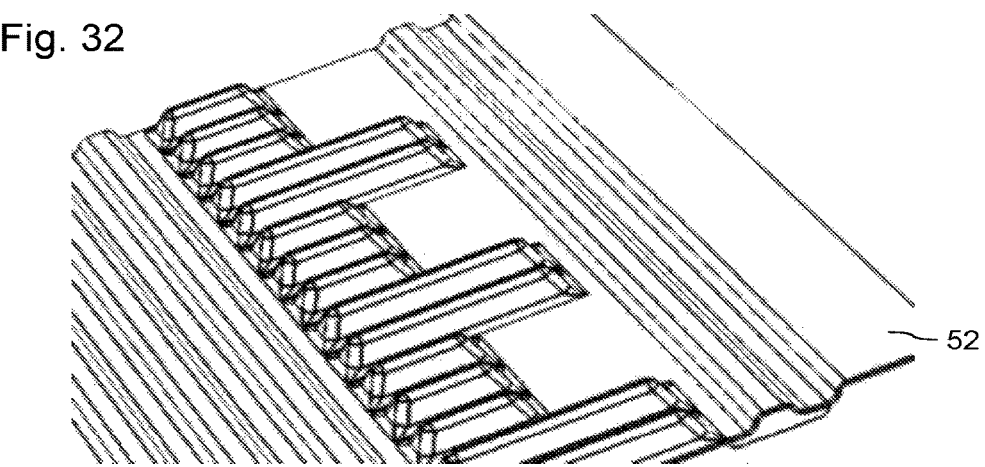
FIG. 32 is a perspective view of a sheet of the bipolar plate from FIG. 23.

The intermediate zone 53 is intended to receive an overlap of the membrane 113 or an overlap of a gas diffusion layer beyond the reactive zone. FIG. 31 is an exploded sectional view illustrating a bipolar plate 5 combined with an example of a membrane electrode assembly 110. The membrane electrode assembly 110 comprises, in a manner known per se, a membrane 113 to which an electrode 111 is fastened. The electrode 111 is covered by a gas diffusion layer 121. A reinforcement 131 is fastened to the periphery of the membrane 113. The reinforcement 131 is in contact with the gasket 2. As illustrated in FIG. 31, the gas diffusion layer 121 has an overlap directly above or plumb with the intermediate zone 53. The electrode 111 is positioned directly above or plumb with the flow channels 541 of the reactive zone 54.

The width of the intermediate zone 53 is intended to take into account the various manufacturing and assembly tolerances, for example the tolerances for positioning the membrane 113 or the gas diffusion layer 121, or tolerances linked to the embossing of a sheet. The intermediate zone 53 extends from the rib 512 to the electrode 111. Coolant flow channels 583 are made between the sheets 51 and 52 directly below or plumb with the reactive zone 54. The coolant flow channels 583 are in communication with the manifolds 593 and 594. The intermediate zone 53 is a zone potentially subject to reactant or coolant short-circuits.

In a first band 537 of the intermediate zone 53, the sheets 51 and 52 have complementary shapes nested one in the other over the entire length of a coolant flow channel 583, as is apparent from the sectional view of FIG. 24. A second band 538 is made in the intermediate zone 53 between the first band 537 and the rib 512. In the second band 538, the sheets 51 and 52 together make coolant storage volumes 536. In the second band 538, the sheet 51 comprises reliefs, for example the top of ribs 531 or flat zones 581. These reliefs are in contact with the gas diffusion layer 121 of the membrane electrode assembly 110.

Thus, in the second band 538, coolant may be present in order to obtain a temperature control in the intermediate zone 53, while limiting the flow in this zone 53 by blocking the flow originating from the flow channels 583 or from the manifold 593, by means of the first band 537. Furthermore, in the second band 538, the reliefs form obstacles for limiting the flow of reactant in the zone 53, and form supports for the gas diffusion layer 121. When the gas diffusion layer 121 partially covers the second band 538, the flow of reactant in the zone 53 is advantageously limited even more.

In the example illustrated, the sheets 51 and 52 comprise ribs, the shape of which is complementary in the first band 537. These ribs extend for example along a direction perpendicular to the flow direction of coolant or of reactant. In practice, the sheets 51 and 52 should not necessarily be pressed against one another in the band 537 but should be close enough to give rise to a very large pressure drop in the face of the passage of coolant originating from the reactive zone 54 toward the storage volumes 536.

The length and the width of each flat surface 581 is advantageously at least equal to the width of a reactant flow channel 541, in order to ensure a good support for the gas diffusion layer 121. Advantageously, in order to limit the possibilities of flow in the second band 538, the sheets 51 and 52 have an alternation of volumes 536 and zones in which these sheets 51 and 52 are pressed against one another, as is more apparent from the sectional view of FIG. 25. The width of the flat surfaces may be different at the anode and cathode, as represented in FIG. 25, since the short-circuit flow may be more detrimental for one reactant than for another.

Advantageously, as is more apparent from the sectional views of FIGS. 26 to 29, the intermediate zone 53 comprises a third band 539 made between the first band 537 and the electrode 111. In this third band 539, a volume 582 is made between the sheets 51 and 52, in order to ensure a coolant flow at the periphery of the reactive zone 54.

Figure 33:
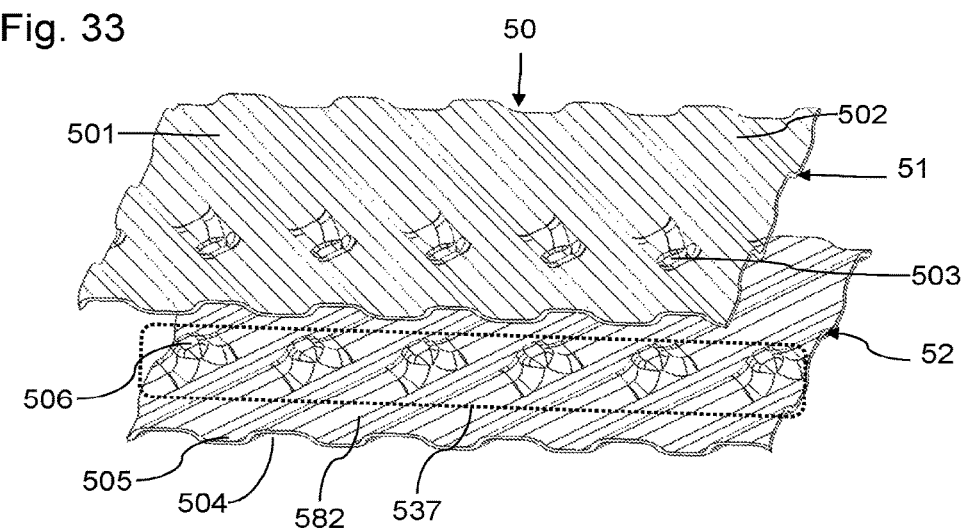
FIG. 33 is an exploded perspective view of a second variant of a bipolar plate of an electrochemical cell according to the fourth aspect of the invention.

A second variant of the fourth aspect of the invention, corresponding to the configuration illustrated in FIG. 17, is illustrated in FIGS. 33 to 35. The coolant flow direction here is substantially perpendicular to the flow direction of the reactants. A reactant homogenizing zone is made here on either side of the reactive zone 54. Reactant homogenizing zones are also made here on the outer face of the sheet 52.

According to this variant, it is desired to isolate a coolant storage zone in a homogenizing zone 50, relative to the coolant flow channels of the reactive zone 54. The reactive zone 54 is not illustrated here.

In the homogenizing zone 50, homogenizing channels 501 are made on the outer face of the sheet 51. These channels 501 are delimited in a manner known per se by ribs 502. The channels 501 are intended to place the flow channels 541 of the reactive zone in communication with a manifold 591 or 596. Directly below or plumb with this homogenizing zone 50, homogenizing channels 504 are made on the outer face of the sheet 52. The channels 504 are delimited in a manner known per se by ribs 505. The channels 505 are intended to place the flow channels of the outer face of the sheet 52 in communication with a manifold 592 or 595.

The homogenizing channels 501 and 504 here extend along different directions. The homogenizing channels 501 and 504 here have a same cross section. Each homogenizing channel 501 comprises an indentation 503, forming a stud on the inner face of the sheet 51. The stud formed is here housed in the internal volume of a rib 505. This stud has a shape complementary to that of the internal volume of the rib 505. A flow of coolant in the internal volume of the ribs 505 is thus blocked by the studs of the sheet 51. Each homogenizing channel 504 comprises an indentation 506, forming a stud on the inner face of the sheet 52. The stud formed is here housed in the internal volume of a rib 502. This stud has a shape complementary to that of the internal volume of the rib 502. A flow of coolant in the internal volume of the ribs 502 is thus blocked by the studs of the sheet 52. Thus, as better illustrated in FIG. 35, corresponding to a broken sectional view through the various studs, a band 537 was made in which the sheets 51 and 52 have complementary shapes nested one in the other, over the entire length of at least one coolant flow channel of the reactive zone. This band 537 thus separates a portion of the homogenizing zone 50 comprising a coolant storage volume, and another zone in communication with the coolant flow channels of the reactive zone 54 and with the coolant manifolds. In the example illustrated, a volume 582 is made between the sheets 51 and 52 in order to ensure a coolant flow at the periphery of the reactive zone.

A third variant of the fourth aspect of the invention, corresponding to the configuration illustrated in FIG. 17, is illustrated in FIG. 36. The coolant flow direction here is substantially perpendicular to the flow direction of the reactants. A reactant homogenizing zone is made here on either side of the reactive zone 54. Reactant homogenizing zones are also made here on the outer face of the sheet 52. According to this variant, it is also desired to isolate a coolant storage zone in a homogenizing zone 50, relative to the coolant flow channels of the reactive zone 54. The reactive zone 54 is not illustrated here.

In the homogenizing zone 50, studs are made that jut out either toward the outside of the sheet 51, or toward the inside of the sheet 51. Directly below or plumb with this homogenizing zone 50, studs are also made that jut out either toward the outside of the sheet 52, or toward the inside of the sheet 52. The sheets 51 and 52 thus carry out, in a manner known per se, a homogenization of their reactants by means of these studs.

Studs 519 that jut out from the inner face of the sheet 51 bear against studs 529 that jut out from the inner face of the sheet 52. A coolant volume is thus made between the sheets 51 and 52 directly below or plumb with the homogenizing zone 50. Furthermore, the sheet 52 comprises an alternation of studs 507 that jut out inwards and studs 508 that jut out outwards. The sheet 51 comprises a same alternation of studs that jut out inwards and studs that jut out outwards, having shapes that are complementary to the studs 507 and 508. The studs 507 and 508 are nested in the corresponding studs of the sheet 51 in a band 537 over at least the length of a coolant flow channel of the reactive zone.

This band 537 thus separates a portion of the homogenizing zone 50 comprising a coolant storage volume, and another zone in communication with the coolant flow channels of the reactive zone 54 and with the coolant manifolds. In the example illustrated, a volume 582 is made between the sheets 51 and 52 in order to ensure a coolant flow at the periphery of the reactive zone.

Figure 37:
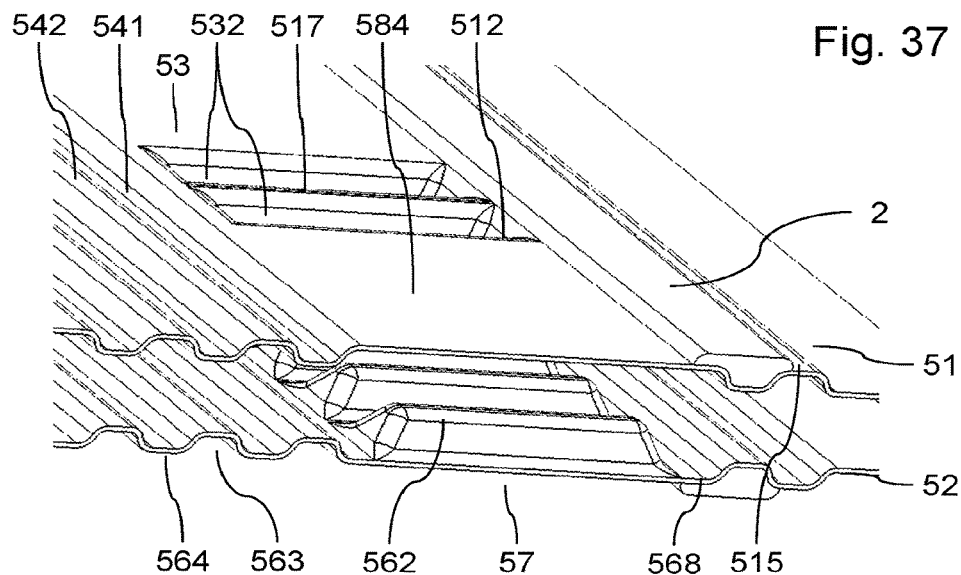
FIG. 37 is an exploded perspective view of a bipolar plate according to a fifth aspect of the invention.
Figure 38:
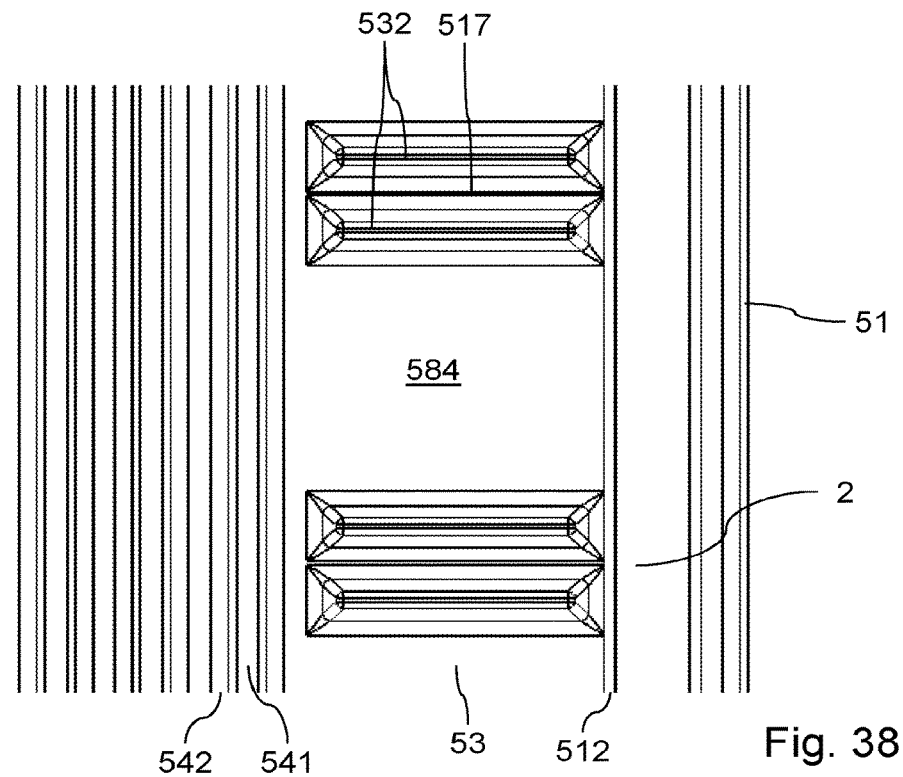
Figure 42:
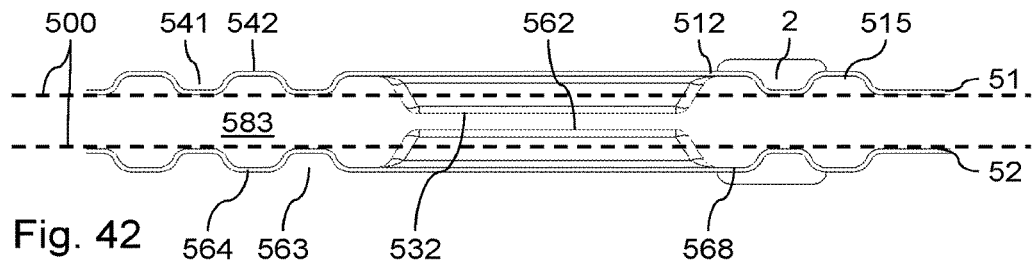

A fifth aspect of the invention relates to a bipolar plate as illustrated in FIGS. 37 to 45. FIG. 37 is an exploded perspective view of an example of a bipolar plate 5 according to one embodiment of this fifth aspect of the invention.

According to this fifth aspect of the invention, each bipolar plate 5 comprises attached conductive sheets 51 and 52. The conductive sheets 51 and 52 may also be formed from embossed metal sheets attached by welding. Coolant flow channels 583 are advantageously made between the sheets 51 and 52 and are in communication with coolant inlet and outlet manifolds as described in detail above.

As in the preceding examples, the outer face of the sheet 51 comprises ribs 542 delimiting flow channels 541 for a reactant, for example the fuel. The flow channels 541 are here intended to place the manifolds 591 and 596 in communication. The zone comprising the flow channels 541 corresponds to the reactive zone 54 of the electrochemical cell. The outer face of the sheet 51 also comprises a rib 512 extending between the manifolds 591 and 596. The rib 512 is intended to form a support for a gasket 2 extending between the manifolds 591 and 596. A rib 515 also extends between the manifolds 591 and 596. The gasket 2 here is straddling the ribs 512 and 515, and also in a groove made between the ribs 512 and 515.

The outer face of the sheet 51 also comprises an intermediate zone 53, positioned between the rib 512 and a rib 542 of the periphery of the reactive zone. The intermediate zone 53 is intended to receive an overlap of a proton exchange membrane or an overlap of a gas diffusion layer beyond the reactive zone. The width of the intermediate zone 53 is intended to take into account the various manufacturing and assembly tolerances, for example the tolerances for positioning the membrane or a gas diffusion layer, or tolerances linked to the embossing of a sheet.

The outer face of the sheet 52 comprises ribs 564 that delimit flow channels 563 for an oxidant. The flow channels 563 are here intended to place the manifolds 592 and 595 in communication. The zone comprising the flow channels 563 also corresponds to the reactive zone of the electrochemical cell. The outer face of the sheet 52 also comprises a rib 568 extending between the manifolds 591 and 596. The rib 568 is intended to form a support for a gasket 2 and extending between the manifolds 592 and 595. The rib 568 is positioned directly below the rib 562, so that a compression of a stack of electrochemical cells is properly applied vertically to the various gaskets of the stack.

The outer face of the sheet 52 also comprises an intermediate zone 57, positioned between the rib 568 and a rib 564 of the periphery of the reactive zone. The intermediate zone 57 is intended to receive an overlap of a proton exchange membrane or an overlap of a gas diffusion layer beyond the reactive zone. The width of the intermediate zone 57 is also intended to take into account the various manufacturing and assembly tolerances, for example the tolerances for positioning the membrane or a gas diffusion layer, or tolerances linked to the embossing of a sheet.

The intermediate zone 53 comprises an alternation of ribs 584 or 517 and of indentations 532. These ribs 584 or 517 extend between the rib 512 and the rib 542 of the periphery of the reactive zone. The ribs 584 and 517 extend perpendicular to an axis connecting the manifolds 591 and 596. In this example, the ribs 517 and 584 extend perpendicular to the rib 512, and perpendicular to the rib 542 of the periphery of the reactive zone.

The intermediate zone 57 comprises an alternation of ribs 561 or 566 and of indentations 562. These ribs 561 or 566 extend between the rib 568 and the rib 564 of the periphery of the reactive zone. The ribs 561 or 566 extend perpendicular to an axis connecting the manifolds 592 and 595. In this example, the ribs 561 or 566 extend perpendicular to the rib 568, and perpendicular to the rib 564 of the periphery of the reactive zone.

The intermediate zones 53 and 57 are subject to reactant short-circuits. The ribs 517 and 584 make it possible to reduce the potential flow area for the fuel in the intermediate zone 53, and the ribs 566 and 561 make it possible to reduce the potential flow area for the oxidant in the intermediate zone 57.

According to the fifth aspect of the invention, it is sought to increase the width of certain ribs of the intermediate zones 53 and 57 in order to limit reactant short-circuit flows, without adversely affecting the mechanical strength of these ribs.

For this purpose, each rib 584 is configured in order to house at least two indentations 562 with which this rib 584 is in contact. Thus, it is possible to produce a relatively wide rib 584 in order to limit the fuel short-circuit flow in the intermediate zone 53, with several supports formed by the indentations 562 in order to avoid a sagging of this rib 584. Each rib 584 could for example have a width at least equal to half its length, or even at least equal to its length.

Each rib 566 is configured in order to house at least two indentations 532 with which this rib 566 is in contact. Thus, it is possible to produce a relatively wide rib 566 in order to limit the fuel short-circuit flow in the intermediate zone 57, with several supports formed by the indentations 532 in order to avoid a sagging of this rib 566. Each rib 566 could for example have a width at least equal to half its length.

Figure 43:
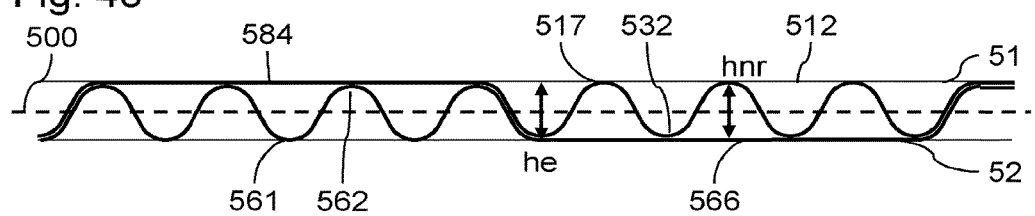
FIG. 43 is a cross-sectional view of an intermediate zone of the bipolar plate from FIG. 37.

In order to optimally limit the flow in the intermediate zones 53 and 57, the height hnr between the indentations 532 and the ribs 517 or 584 (or between the indentations 562 and the ribs 566 or 561) is at least equal to 75% of the total height he of the flow channels in the reactive zone 54, he being obtained by subtracting the total sheet thickness from the thickness of the bipolar plate 5 in this zone (he being illustrated for example in FIG. 43).

In the examples illustrated, the sheets 51 and 52 are in contact in the reactive zone level with a mid-plane 500 of the bipolar plate 5. The indentations 532 and 562, and also the ribs 517, 584, 561 and 566 extend on either side of this mid-plane 500. The sheets 51 and 52 may of course be in contact in the reactive zone with an offset relative to this mid-plane 500 of the bipolar plate 5.

Advantageously, the width of the rib 584 housing several indentations 562 is greater than the width of the rib 566 housing several indentations 532, as illustrated in the examples from FIGS. 37 to 41. Indeed, a fuel such as molecular hydrogen has a viscosity lower than that of an oxidant such as air or molecular oxygen, which justifies favouring the limitation of the short-circuit flow in the zone 53 relative to the zone 57. In the example illustrated in FIG. 37, in order to increase the width of the rib 584 with more supports, the rib 584 houses at least three indentations 562, in this case four indentations.

The first and fifth aspects of the invention may advantageously be combined. In the variant illustrated in FIG. 44 (sectional view through the intermediate zones 53 and 57), the ribs 584 comprise a rib or protrusion 599 also extending between the rib 512 and a rib 542. The protrusion 599 defines the top 556 of the rib 584, so that the rib 584 has a height greater than that of the ribs 542. The protrusion 599 is positioned directly above a rib 561. Two indentations 562 are in contact with the rib 584 on either side of each protrusion 599. The protrusion 599 comprises junctions 551 between the top 556 and the contacts 558 of the rib 584 with the indentations 562. These junctions 551 have a portion set back relative to a straight line connecting the top 556 and the closest contacts 558. Thus, according to a first aspect of the invention, a depression of the protrusions 599 is favoured during the application of a pressure by the overlap of a gas diffusion layer in the intermediate zone 53.

Figure 44:
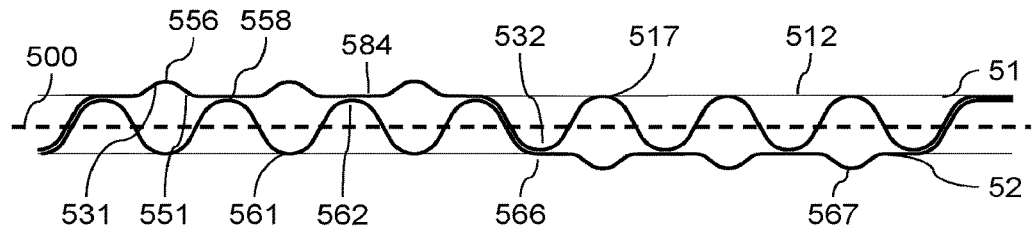
FIG. 44 is a cross-sectional view of a variant of an intermediate zone of a bipolar plate according to the fifth aspect of the invention.
Figure 45:
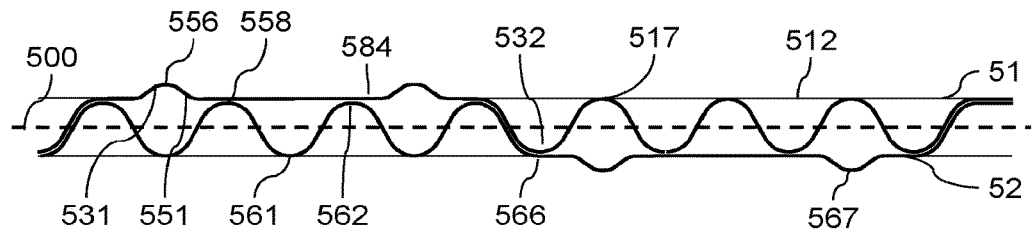
FIG. 45 is a cross-sectional view of another variant of an intermediate zone of a bipolar plate according to the fifth aspect of the invention.

In the example illustrated in FIG. 44, a protrusion 599 is made between each pair of indentations 562. In the example illustrated in FIG. 45, a protrusion 599 is made only directly above certain ribs 561.

Similarly, the ribs 566 advantageously comprise a rib or protrusion 567 also extending between the rib 568 and a rib 564. The protrusion 567 defines the top of the rib 566, so that the rib 566 has a height greater than that of a rib 564. The protrusion 567 is positioned directly below a rib 517. Two indentations 532 are in contact with the rib 566 on either side of each protrusion 567. The protrusion 567 comprises junctions between its top and the closest contacts between the indentations 532 and the rib 566. Thus, a depression of the protrusions 567 is also favoured during the application of a pressure by the overlap of a gas diffusion layer in the intermediate zone 57.

The invention claimed is:

1. An electrochemical cell, comprising:
a membrane electrode assembly including a proton exchange membrane and first and second electrodes fastened to opposite faces of said membrane;
a bipolar plate, including first and second conductive sheets, and in which:
an inlet manifold and an outlet manifold of coolant, and an inlet manifold and an outlet manifold of a reactant are made through the first and second conductive sheets;
coolant flow channels are made between the conductive sheets and are in communication with the coolant inlet and outlet manifolds;
an outer face of the first conductive sheet including:
reactant flow channels in communication with the reactant inlet and outlet manifolds, covered by the first electrode of the membrane electrode assembly;
a first rib extending on the side of the reactant flow channels, a gasket extending at least partially on said first rib;
the bipolar plate including
an intermediate zone extending between the first rib and said first electrode, the intermediate zone comprising:
a first band in which the first and second sheets have complementary shapes nested one in the other over the entire length of at least one coolant flow channel; and
a second band positioned between the first band and the first rib, in which the first sheet comprises reliefs in contact with the membrane electrode assembly, and in which at least one coolant storage volume is made between the first and second sheets.

2. The electrochemical cell according to claim 1, in which a direction connecting the coolant inlet manifold to the coolant outlet manifold is substantially parallel to a direction connecting the reactant inlet manifold and the reactant outlet manifold.

3. The electrochemical cell according to claim 2, in which the membrane electrode assembly includes a gas diffusion layer covering said first electrode and partially covering said second band.

4. The electrochemical cell according to claim 3, in which said reliefs include flat surfaces, the width and length of which are at least equal to the width of a reactant flow channel.

5. The electrochemical cell according to claim 2, in which said intermediate zone further comprises a third band in which a volume is made between the first and second sheets for the coolant.

6. The electrochemical cell according to claim 2, in which said outer face of the first sheet includes second ribs delimiting said reactant flow channels, and in which the intermediate zone includes third ribs extending between one of said second ribs and the first rib.

7. The electrochemical cell according to claim 2, in which the first and second sheets form, in the second band, an alternation of coolant storage volumes and zones in which the first and second sheets are in contact.

8. The electrochemical cell according to claim 1, in which a direction connecting the coolant inlet manifold to the coolant outlet manifold is substantially perpendicular to a direction connecting the reactant inlet manifold and the reactant outlet manifold.

9. The electrochemical cell according to claim 8, in which the outer face of the first sheet includes a reactant homogenizing zone made between one of said reactant manifolds and said reactant flow channels, said intermediate zone being made in the reactant homogenizing zone.

10. The electrochemical cell according to claim 9, in which the outer face of the first sheet includes first reactant homogenizing channels delimited by respective fourth ribs and in which the outer face of the second sheet comprises second reactant homogenizing channels delimited by respective fifth ribs, said first homogenizing channels extending along directions different from those of the second homogenizing channels, said first homogenizing channels comprising indentations forming respective studs on the inner face of the first sheet in said first band of the intermediate zone, said studs being housed in the internal volume of the fifth ribs, said second homogenizing channels including indentations forming respective studs on the inner face of the second sheet in said first band of the intermediate zone, said studs being housed in the internal volume of the fourth ribs.

11. The electrochemical cell according to claim 9, in which homogenizing studs are made on the inner faces of the first and second sheets plumb with said homogenizing zone, homogenizing studs of the first and second sheets being in contact.

12. The electrochemical cell according to claim 1, in which said first rib extends between the reactant inlet and outlet manifolds.

* * * * *